United States Patent
Chang et al.

(10) Patent No.: US 7,263,148 B2
(45) Date of Patent: Aug. 28, 2007

(54) SOURCE SYNCHRONOUS CDMA BUS INTERFACE

(75) Inventors: Mau-Chung F. Chang, Los Angeles, CA (US); Jongsun Kim, Los Angeles, CA (US)

(73) Assignee: Mastek International, Los Angeles, CA (US)

( * ) Notice: Subject to any disclaimer, the term of this patent is extended or adjusted under 35 U.S.C. 154(b) by 822 days.

(21) Appl. No.: 10/669,040

(22) Filed: Sep. 22, 2003

(65) Prior Publication Data

US 2004/0110519 A1 Jun. 10, 2004

Related U.S. Application Data

(63) Continuation-in-part of application No. 09/839,107, filed on Apr. 20, 2001, now Pat. No. 6,856,788.

(51) Int. Cl.
*H04L 7/00* (2006.01)

(52) U.S. Cl. ...................... 375/354; 375/145

(58) Field of Classification Search .............. 375/219, 375/295, 130, 145, 354; 455/502
See application file for complete search history.

(56) References Cited

U.S. PATENT DOCUMENTS

| | | | | |
|---|---|---|---|---|
| 3,969,706 A | | 7/1976 | Proebsting et al. ......... | 340/173 |
| 5,274,665 A | * | 12/1993 | Schilling ..................... | 375/144 |
| 5,856,980 A | * | 1/1999 | Doyle .......................... | 714/704 |
| 6,128,696 A | | 10/2000 | Farmwald et al. .......... | 711/105 |
| 6,134,215 A | * | 10/2000 | Agrawal et al. ............. | 370/209 |
| 6,418,537 B1 | * | 7/2002 | Yang et al. .................. | 713/400 |
| 6,490,325 B1 | * | 12/2002 | Fiedler et al. ............... | 375/257 |
| 7,035,344 B2 | * | 4/2006 | Feher .......................... | 375/271 |
| 2001/0033611 A1 | * | 10/2001 | Grimwood et al. ......... | 375/219 |

* cited by examiner

*Primary Examiner*—Dac V. Ha
(74) *Attorney, Agent, or Firm*—Koppel, Patrick, Heybl & Dawson

(57) ABSTRACT

A wireless IC interconnect system and a source synchronous CDMA (SS-CDMA) bus interface facilitate interconnections between first and second IC locations. A signal conveyed using the wireless system is modulated and capacitively coupled to a transmission medium, and then capacitively coupled from the medium to a receiver which demodulates the modulated signal and provides the demodulated signal to the second IC location. Multiple signals can be conveyed simultaneously by modulating and demodulating them using multiple access algorithms such as CDMA and/or FDMA. The SS-CDMA bus interface utilizes source synchronous signaling and CDMA techniques to provide high bus concurrency and low channel latency. The interface is re-configurable, and provides multi-chip access in high-bandwidth multi-drop parallel interconnection applications. The interface employs spread spectrum multiple access schemes, which enable two or more data bits to be sent through the same channel simultaneously and successfully recovered at the receiver.

23 Claims, 21 Drawing Sheets

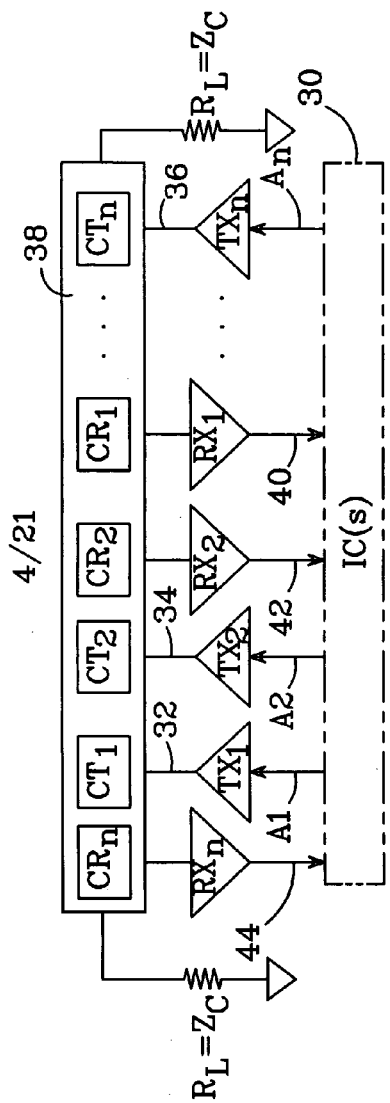
FIG.4a
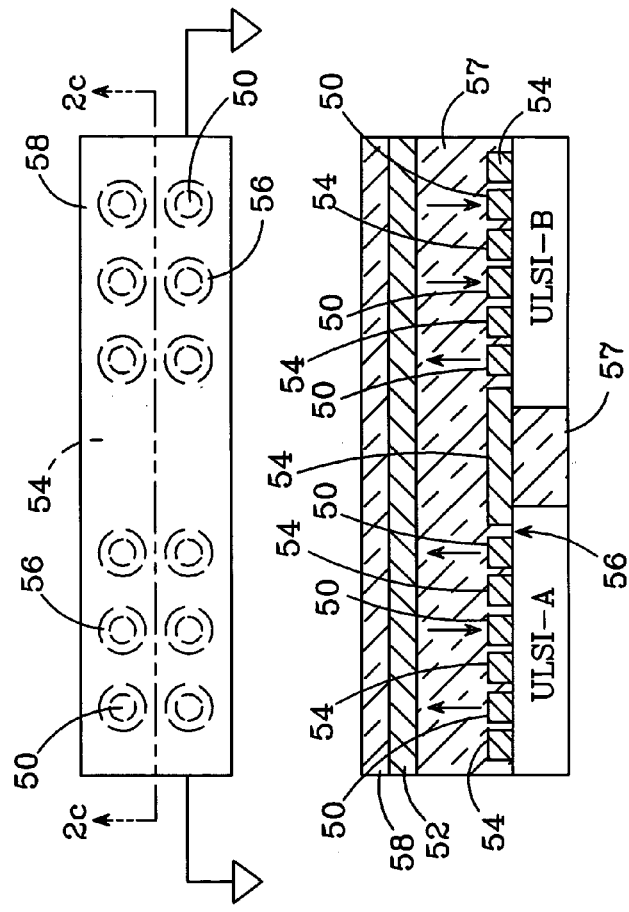
FIG.4b
FIG.4c

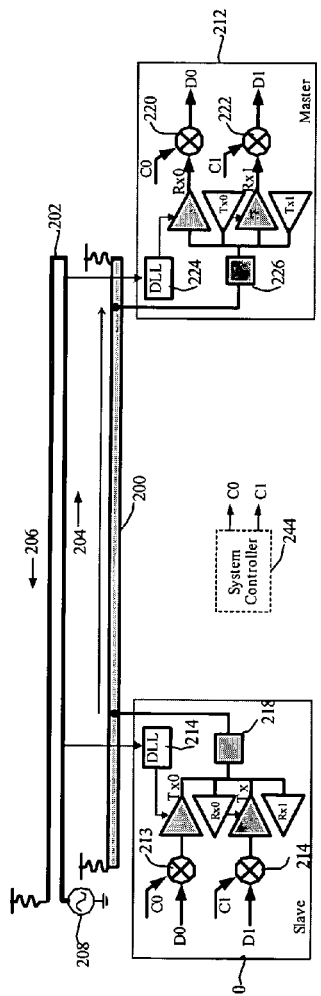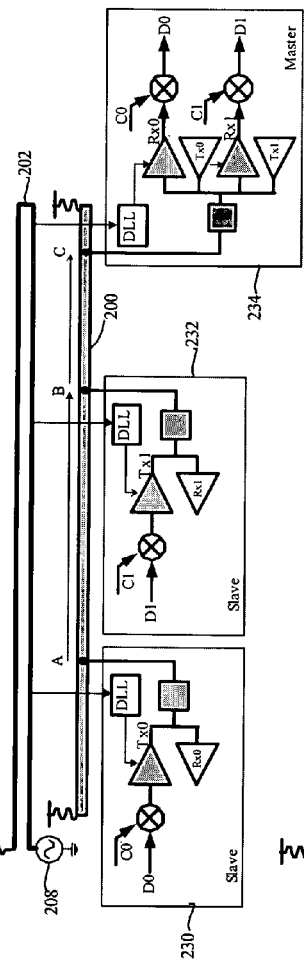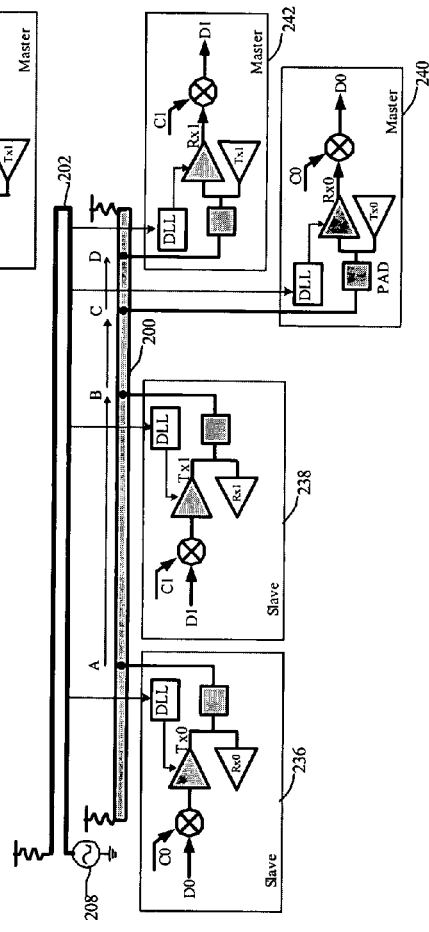
Fig. 12 a
Fig. 12 b
Fig. 12 c

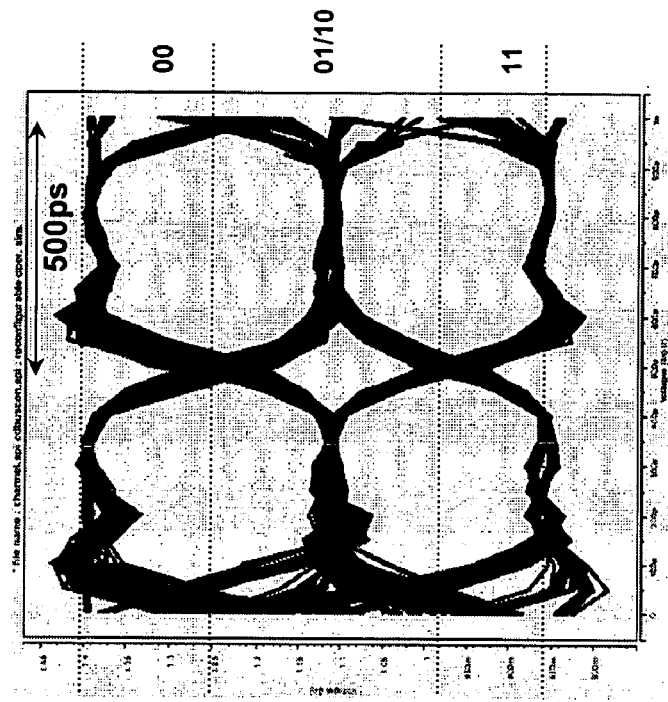
Fig. 14 c
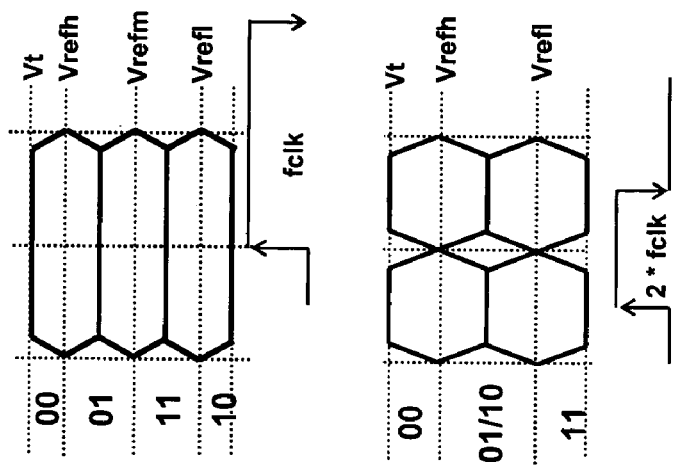
Fig. 14 a
Fig. 14 b

SOURCE SYNCHRONOUS CDMA BUS INTERFACE

CROSS-REFERENCE TO RELATED APPLICATIONS

This application is a continuation-in-part of application Ser. No. 09/839,107, filed Apr. 20, 2001 now U.S. Pat. No. 6,856,788.

BACKGROUND OF THE INVENTION

1. Field of the Invention

This invention relates to the field of integrated circuit (IC) interconnections, and particularly to wired and wireless systems and methods of effecting inter- and intra-chip interconnections.

2. Description of the Related Art

Chip-to-chip communications—i.e., the transfer of data between different ICs within a system—are under ever-increasing pressure to perform faster. This is particularly true for bus-based communications between a CPU and RAM in a computer system.

The traditional chip-to-chip communication speed on a printed circuit board (PCB) is usually much lower than the speed of a CPU. Thus, chip-to-chip communication speed usually limits system performance. In particular, the bandwidth and latency of memory systems have been limiting factors for system performance. This so-called "memory wall" has been the subject of much research, and there have been numerous dynamic RAM (DRAM)-oriented approaches to increase DRAM bandwidth or reduce DRAM core access latency. In the current PC industry, 1.1 GB/s PC133 SDRAM, 1.6 GB/s Direct-Rambus DRAM (D-RDRAM) and 2.1 GB/s DDR266 are the most popular products focusing on DRAM bandwidth. However, the approaches taken by these RAM systems—which each rely on a traditional memory bus interface—can only do so much, as they are designed for system architectures having many sources of overhead. For instance, even with a DRAM core access latency of zero, the overhead of any of these memory systems would not reduce to zero, because bus transactions still require time on the channel.

The costs associated with DRAM memories increases with the number of I/O pins on the DRAM package. The performance of a memory system could be increased somewhat by widening memory channels and by providing independent DRAM banks. However, both these approaches increase cost; furthermore, channel latency and concurrency problems still exist. FIGS. 1(a) and 1(b) show two typical primary memory bus configurations, in which n DRAM chips 10 are connected to a common data bus 12 and to an address/control bus 14, and the bus lines are connected to a CPU 16 and a memory controller 18 interconnected as shown. If these configurations utilize a conventional memory bus, such as the high-speed narrow channels used in D-RDRAM, they suffer from long channel latency: for instance, if two read requests arrive at DRAM1 back-to-back or two read requests arrive at DRAM1 and DRAM2, respectively, the second request must stall until the first request finishes using the shared data bus. Increasing bus speed improves performance, but channel request latency still exists.

To send or receive 1 bit of data on a conventional bus interface using a data channel, one physical PCB line and two transceivers are needed. As illustrated in FIG. 2, sending or receiving 2 bits of data at the same time requires 2 PCB lines 20, 22 and 4 transceivers 24, 26, 28, 30 (which connect to DRAM chips 32, 33 via respective interface circuits 34, 35); the transceivers are typically connected to the PCB lines via I/O pads 36. Increasing data bandwidth requires an increase in bus frequency and/or the number of parallel PCB lines. But, high frequency parallel lines create crosstalk noise and degrade signal integrity. To mitigate this, the number of data and address lines should be equal, and extra shielding lines should be used on the PCB. However, this causes the die size and package size to increase, and thus complicates PCB design.

Other memory bus systems have attempted to solve the problems of high-speed access to memory with limited success. For example, in U.S. Pat. No. 3,969,706 to Proebsting et. al., a DRAM interface is described. The address is two-way multiplexed, and there are separate pins for the data and control lines (RAS, CAS, WE, CS). However, under this approach, the number of I/O pins must increase with the size of the DRAM, with the pin count possibly becoming unacceptably large with the high capacities of modern-day DRAM chips.

U.S. Pat. No. 6,128,696 to Farmwald et. al. describes a D-RDRAM system, which receives address and control information over a data bus in packet form and transmits or receives request data over the same bus. This "Rambus" system is divided into three sections: a DRAM core, a memory interface, and an I/O interface. The I/O interface section is connected to the communication channels with a plurality of pins. By running the bus at a 400 MHz clock rate and using 16 data channels and 8 address channels, a peak bandwidth of 1.6 Gbyte/s can be achieved.

However, though D-RDRAMs can reduce the number of I/O pins needed by using a high speed bus interface, they typically require a number of shielding pins to reduce the cross-talk noise and inter-symbol interference (ISI) effects on the PCB board. The result is a negligible reduction in the total number of data, address, supply, and ground pins needed. D-RDRAMs may also require a 184 pin package, which increases chip cost.

Device properties also have a significant effect of chip-to-chip communications. To enhance circuit and system performance, considerable effort has been expended on improving device speed by reducing the device dimensions. This decrease in minimum feature size has led to a proportional decrease in the cross-sectional area and pitch of metal interconnects ("wires"). As a result, the parasitic resistance, capacitance and inductance associated with an IC's wires are beginning to adversely affect circuit performance, and have increasingly become a primary stumbling block in the evolution of deep sub-micron ultra-LSI (ULSI) technology. Recent studies have indicated that when feature sizes fall below 1 μm, the interconnect parasitics cause signal attenuation and dispersion in the wires, seriously hurting circuit and system performance. These problems become even more acute when the bit rate capacity exceeds $\sim 10^{16}$ A/l$^2$, where A is the cross sectional area of the interconnect wiring and l is the length of the wire. The RC (or LC) time delay, IR voltage drop, CV$^2$f power loss and crosstalk parameters of an IC's wires also become significant at higher bit rates.

For the past few years, a great deal of work has been focused on improving conventional interconnect technology by reducing the resistivity of conductors (using copper, for example) and reducing the dielectric constant of interlayer dielectric materials (by using low-κ polymers, for example). Nevertheless, these evolutionary approaches may soon encounter fundamental material limits which will inhibit further feature size reductions and/or bit rate increases.

SUMMARY OF THE INVENTION

A wireless IC interconnect system and method and a source synchronous CDMA (SS-CDMA) bus interface are presented which overcome the problems noted above.

The present wireless interconnection system serves. to largely eliminate the bit rate and feature size limitations associated with conventional metal interconnects. In accordance with the present invention, interconnections are made between first and second IC locations via a wireless transmission medium. A signal to be conveyed from a first IC location to a second IC location is modulated, and the modulated signal is capacitively coupled to the wireless transmission medium. The modulated signal propagates through the wireless transmission medium, and is capacitively coupled to a receiver which demodulates the modulated signal and delivers the demodulated signal to the second IC location. The wireless medium is preferably either a microstrip data channel (MTL) or a coplanar waveguide (CPW), which is preferably terminated at both ends with an impedance equal to the medium's characteristic impedance $Z_C$. The first and second IC locations may be on the same die or separate dies, such that either intra-chip or inter-chip interconnections are facilitated.

In a preferred embodiment, the wireless transmission medium conveys numerous signals simultaneously, each of which is modulated and capacitively coupled into the medium, propagated, and then capacitively coupled out of the medium, demodulated, and fed to their respective destinations. The signals are preferably modulated and demodulated with multiple access algorithms, such as code-division (CDMA) and/or frequency-division (FDMA) multiple access algorithms, which provide a means of distinguishing between the simultaneously propagating signals. When using a CDMA algorithm, each of the modulated signals can be assigned an associated orthogonal address code. The interconnection system is made reconfigurable by making these codes programmable, such that the destinations of the modulated signals are changed by simply reprogramming the address codes.

The present SS-CDMA bus interface utilizes source synchronous signaling and direct-sequence code-division multiple access (CDMA) techniques to provide high bus concurrency and low channel latency. The interface is re-configurable, and provides multi-chip access for applications in high-bandwidth multi-drop parallel interconnections such as a memory bus without increasing the number of independent channels or different DRAM banks.

The new interface employs direct-sequence spread spectrum (DS-SS) multiple access schemes, which enable two or more separate data bits be sent through the same channel simultaneously and successfully recovered at the receiver. The present bus interface is suitably employed in a wired multi-drop memory bus system based on 3-PAM signaling with source synchronous clocking to simultaneously send two bits of data through one PCB channel. By decreasing the number of channels required, signal integrity is improved and interface power consumption is reduced. Further, higher performance and lower bus interface costs are achieved due to the use of fewer pins and PCB channels, smaller die and package size, and simplified PCB design.

Further features and advantages of the invention will be apparent to those skilled in the art from the following detailed description, taken together with the accompanying drawings.

BRIEF DESCRIPTION OF THE DRAWINGS

FIG. 4a is a diagram illustrating the use of the present wireless interconnection system to convey multiple signals simultaneously.

FIGS. 4b and 4c are plan and corresponding cross-sectional views, respectively, of a preferred embodiment of the present wireless interconnection system.

FIGS. 12a-12c are block diagrams of three different possible configurations for an SS-CDMA bus interface per the present invention.

FIGS. 14a-14c depict output waveforms achievable for a conventional bus system and an SS-CDMA bus interface per the present invention.

DETAILED DESCRIPTION OF THE INVENTION

Figure 1A:
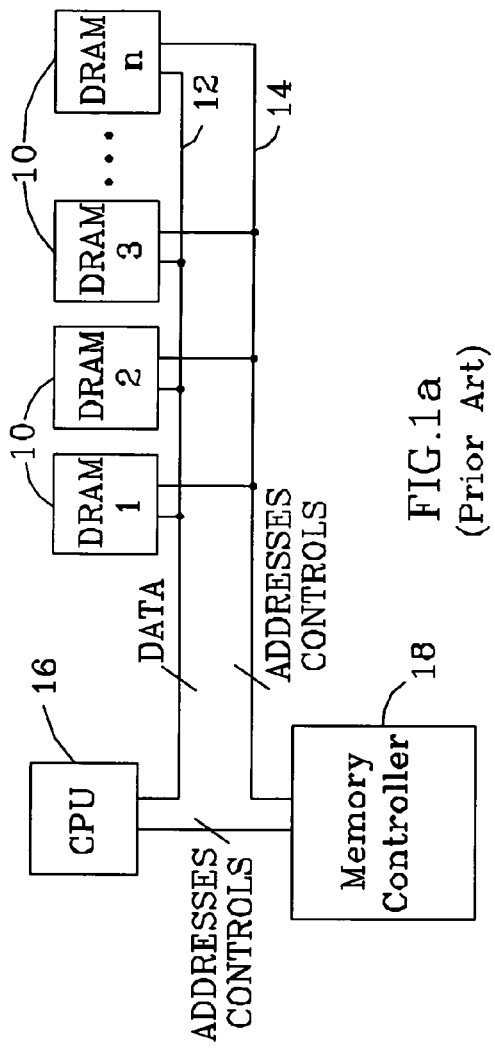
FIGS. 1a and 1b are block diagrams of known memory bus configurations.
Figure 1B:
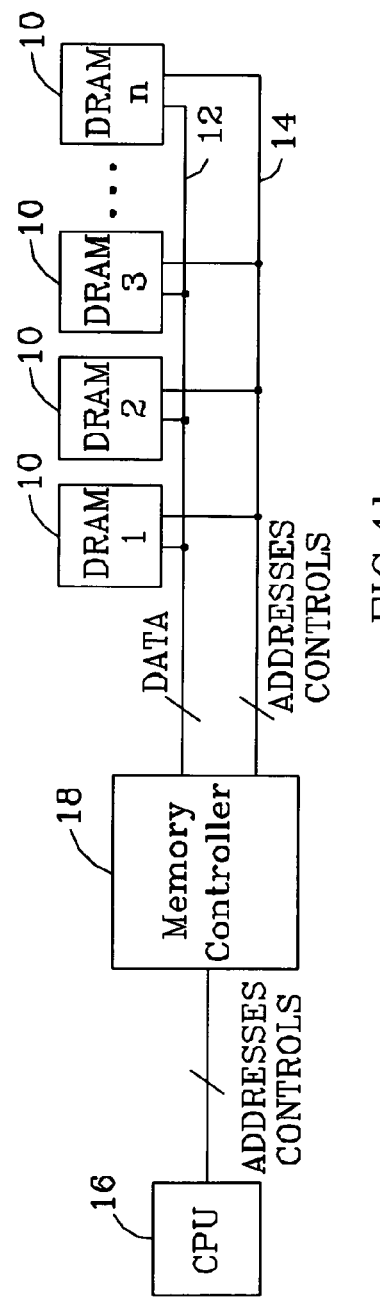
Figure 2:
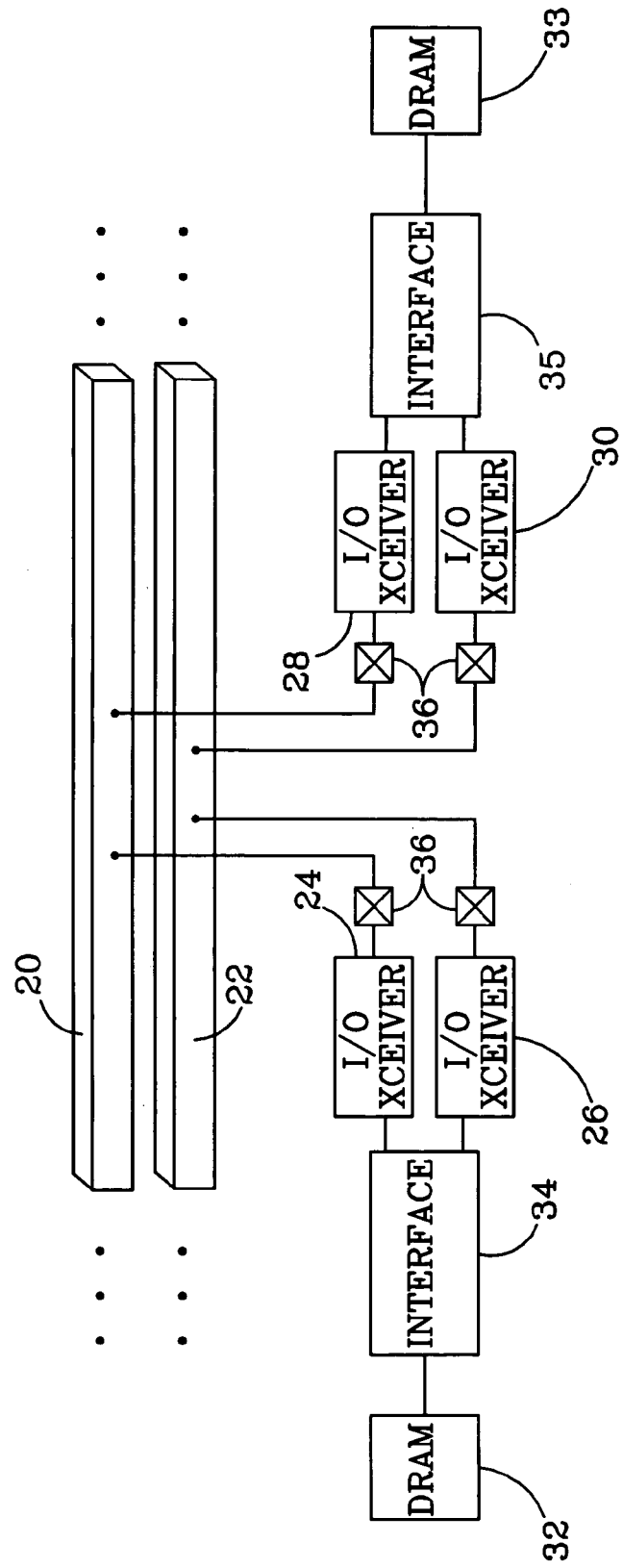
FIG. 2 is a block diagram of a known bus interface.
Figure 3A:
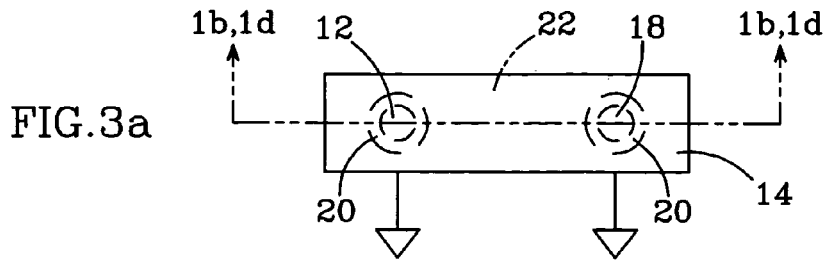
FIG. 3a and 3b are plan and corresponding cross-sectional views, respectively, of a wireless interconnection system per the present invention.
Figure 3B:
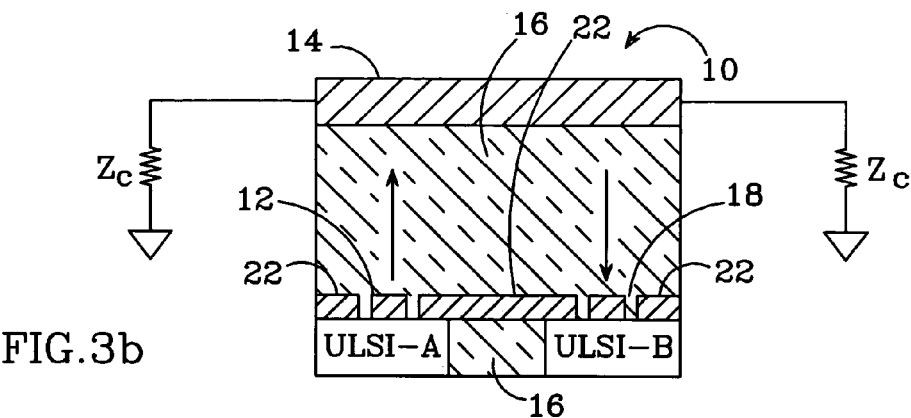

The basic principles of a wireless interconnection system in accordance with the present invention are shown in FIGS. 3a and 3b, which show plan and corresponding cross-sectional views of a package 10 which employs the present invention. The package includes two integrated circuits ULSI-A and ULSI-B which require interconnection. In this example, ULSI-A produces a signal which must be conveyed to ULSI-B. Conventionally, such a signal would be conveyed via a metal interconnect or a wire bond. Here, however, the signal is conveyed wirelessly. The signal from ULSI-A is modulated and routed to a first capacitive coupler 12, which capacitively couples the signal to a wireless transmission medium 14. The wireless transmission medium is physically separated from the ICs, and the ICs separated from each other, with a dielectric filler material 16.

The capacitively coupled signal propagates through wireless transmission medium 14. A second capacitive coupler 18 couples the propagating signal from medium 14 to a receiver, which demodulates the signal and delivers it to its destination on ULSI-B. In this way, the invention provides a wireless interconnection between ULSI-A and ULSI-B, thereby avoiding the inherent limitations presented by a wired connection.

With appropriate designs, RF/microwave signals can be transmitted efficiently through either free space or guided mediums. Free space signal broadcasting/receiving is common practice in modern wireless systems, due to its excellent channeling capability and low cost implementation. However, the efficient transmission and reception of RF/microwave signals in free space requires the size of the antenna to be comparable to the signals' wavelengths. As operating speeds approach and exceed 100 GHz, the optimal aperture size of the antenna needs to be on the order of 1 mm$^2$, which is too large to be comfortably implemented in current and future ULSI packages.

The invention overcomes these problems by employing capacitive couplers to couple signals to and from a guided medium. Instead of using a sizable "far field" antenna to broadcast signals, as discussed above, the invention uses smaller "near field" capacitive couplers, which perform adequately over relatively short distances (several centimeters or less). The use of capacitive couplers in an enclosed package also avoids the need to comply with FCC regulations regarding RF communications. Capacitive couplers 12 and 18 are surrounded with respective isolation gaps 20, and a grounded metal shield 22.

A guided medium, such as a microstrip data channel (MTL) or coplanar-wave-guide (CPW), is known to have low attenuation up to at least 200 GHz. For example, simulations indicate that signals transmitted through a 1 cm long CPW experience extremely low loss (~−1.6 dB at 100 GHz) and low frequency dispersion (<~2 dB) across the complete frequency range of simulation (50-150 GHz). Conventional metal interconnects, on the other hand, exhibit large losses: up to −60 dB and −115 dB per centimeter at 100 GHz for 1 μm and 0.1 μm wide interconnect lines, respectively. The frequency dispersion of these interconnects also reaches 30-40 dB across the same frequency range. Clearly, conventional metal lines with narrow geometries may be inadequate for global interconnect applications in current and future high speed ICs. The performance afforded by the present invention, however, meets or exceeds such requirements.

As noted above, wireless transmission medium 14 is preferably a guided medium such as a MTL or CPW. The center/top conductor of the CPW/MTL is typically 10-100 μm wide, depending on its characteristic impedance $Z_C$ (typically 25-100Ω) and other signal transmission requirements. To accommodate its size, a CPW or MTL can be used as an "off-chip" but "in-package" transmission medium and shared by multiple ULSI I/Os. Alternatively, medium 14 may be fabricated as an integral part of an IC. A CPW requires that the conductor and ground to be in the same plane, while a MTL does not. For this reason, MTLs are preferred, particularly if multiple microstrips are to be run.

Figure 3C:
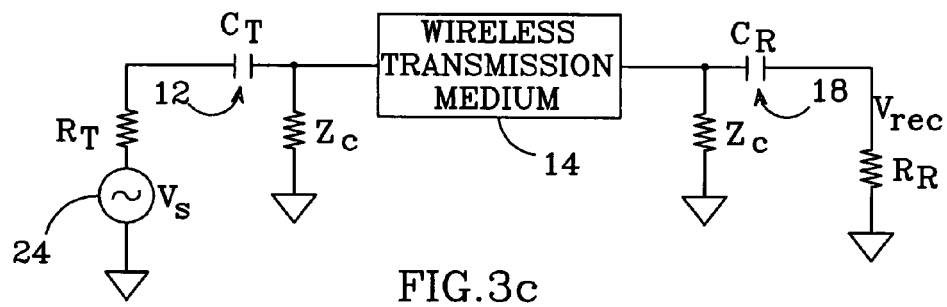
FIG. 3c is an equivalent circuit schematic for a representative transmitter-receiver loop per the present invention.

An equivalent circuit of the invention as used to convey a single signal is shown in FIG. 3c. A signal source 24 provides a signal to a transmitter having an output resistance $R_T$, which modulates the signal and delivers it to a capacitive coupler 12 having a capacitance $C_T$, which couples the modulated signal into wireless transmission medium 14. The signal propagates through medium 14, and is coupled from the medium by a capacitive coupler 18 having a capacitance $C_R$ to a receiver having an input resistance $R_R$, which demodulates the signal and delivers it to its destination. As noted above, medium 14 is terminated at both ends by its characteristic impedance $Z_C$.

When so arranged, the voltage $V_{rec}$ received at the receiver is given by:

$$V_{rec} = \frac{\frac{Z_C}{2} R_R}{\left(\frac{Z_C}{2} + R_T - j\frac{1}{\omega C_T}\right)\left(\frac{Z_C}{2} + R_R - j\frac{1}{\omega C_R}\right)} V_s \exp(-j\beta d) \quad (1)$$

where $V_s$ is the source signal voltage and d is the distance between the transmitter and receiver. It is clear from Eq. (1) that $R_T$ and $R_R$ should be much greater than $Z_C$ to preserve the wireless medium's characteristic impedance, and that $$R_R \gg j\frac{1}{\omega C_R}$$

and $$R_T \gg j\frac{1}{\omega C_T}$$

to obtain a dispersion-free $V_{rec}$.

Figure 3D:
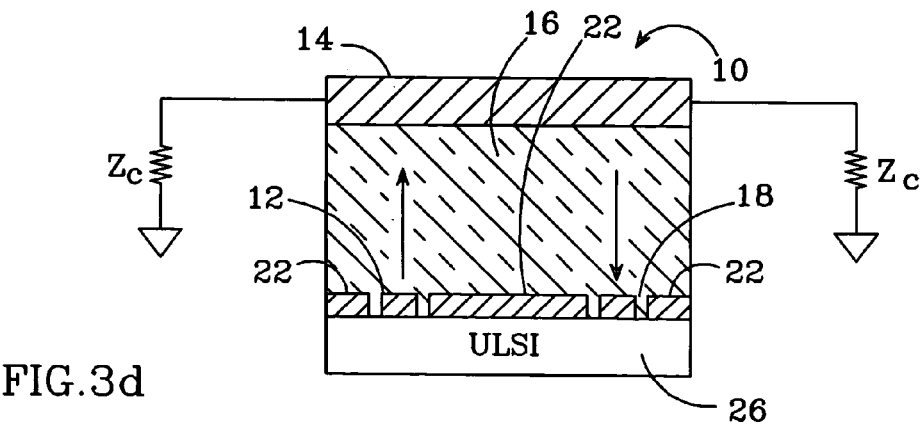
FIG. 3d is a cross-sectional view corresponding with the plan view of FIG. 1a which shows the invention providing an intra-chip interconnection.

In FIG. 3b, the invention is depicted as furnishing an interconnection between two separate ICs, thereby providing an inter-chip interconnection. As shown in FIG. 3d, the invention may also be used to provide intra-chip interconnections, wherein a signal is conveyed between two locations on a common IC die 26.

While suitable for providing a single interconnection as shown in FIGS. 3a-3d, the invention is preferably used to provide multiple interconnections via a common wireless medium. A diagram illustrating this arrangement is shown in FIG. 4a. One or more ICs 30 generate signals $A_1, A_2, \ldots, A_n$, which need to be conveyed from respective first IC locations to respective second IC locations. Each of signals $A_1, A_2, \ldots, A_n$ are connected to respective transmitters $TX_1, TX_2, \ldots, TX_n$, which modulate them and provide the modulated signals (32, 34 and 36) to respective capacitive couplers $CT_1, CT_2, \ldots, CT_n$. Each of the capacitive couplers couples its respective modulated signal into a wireless transmission medium 38, which is preferably terminated at both ends with its characteristic impedance $Z_C$. All of the coupled signals propagate simultaneously through medium 38.

The wireless interconnection system also includes receivers $RX_1, RX_2, \ldots, RX_n$ connected to respective capacitive couplers $CR_1, CR_2, \ldots, CR_n$, which couple the modulated signals to their respective receivers. The receivers demodulate the signals and deliver the demodulated signals (40, 42, 44) to their respective destinations.

In this way, the invention facilitates multiple interconnections with a common wireless transmission medium. Simulations indicate that such a single shared data channel can support at least 20 transmitter/receiver (TX/RX) pairs with low losses. For example, assume $TX_n$ and $RX_n$ are placed at opposite ends of medium 38, and 19 other TX/RX pairs are spaced uniformly across the medium. Further assume that $R_T = R_R = 5k\Omega = 100 * Z_C$, and $$\frac{1}{\omega C_T} = \frac{1}{\omega C_R} < 0.1 R_T.$$

Simulations indicate that the signal loss caused by shunting 20/20 TX/RX in this way is about 0.3 dB/cm. The loss is still as low as 0.8 dB/cm when $R_T$ and $R_R$ are reduced to 2 k$\Omega$.

Larger $C_T$ and $C_R$ values improve the capacitive coupling between a system's transceivers and the transmission medium. However, the size of $C_T$ and $C_R$ are preferably made small enough to be compatible with the processes used to fabricate the source and destination ICs. A good compromise is provided by choosing $R_T = R_R = 2$ k$\Omega$ and $$\frac{1}{\omega C_T} = \frac{1}{\omega C_R} < 0.1 R_T.$$

When operating at 100 GHz, the required $C_T$ or $C_R$ capacitance is estimated to be larger than 8.3 fF. Assuming the vertical coupling distance is 25 μm and using ZrO ($\epsilon_r > 10$) as the dielectric between coupler electrodes, the pad size of $C_T$ or $C_R$ is calculated to be <600 μm². Capacitive couplers of this size can be easily implemented in present and future ULSI designs.

Assuming a CMOS transmitter output stage which is operated in class A and biased at $V_{dd} = 1.8$ volt, the signal power received at the farthest $RX_n$ is calculated as $P_{rec} = -[39 + 10\text{Log}(L)]$ dBm according to the formula:

$$P_{rec} = LV_{dd}^2 Z_C^2/(8 R_R R_T^2) \quad (2)$$

where L accounts for the medium's attenuation. Since the signal is virtually dispersion-free, it can be boosted to an adequate power level at the receiver by CMOS pre-amplifiers for subsequent signal/data processing. System noise floor and receiver sensitivity should be analyzed to ensure the adequacy of $P_{rec}$ if low bit error rate (BER) communications must be supported.

FIGS. 4b and 4c depict plan and corresponding cross-sectional views, respectively, of an exemplary wireless interconnection system arranged to convey multiple signals simultaneously. Each of two ICs, ULSI-A and ULSI-B, include multiple capacitive couplers 50, which couple respective signals between the ICs and a wireless transmission medium 52. As before, the capacitive couplers are surrounded with a grounded metal shield 54, with isolation gaps 56 between the couplers and the metal. A dielectric filler material 57 fills the space between the ICs and medium 52, and the package preferably includes an insulating layer 58 above transmission medium 52.

The signals must be modulated prior to being capacitively coupled to the transmission medium. The modulation can be done with either a digital or analog carrier. As multiple signals propagate simultaneously within the transmission medium, the modulation scheme must provide a means of distinguishing between the propagating signals when received. This is preferably accomplished by modulating the signals using multiple-access algorithms, such as FDMA and CDMA algorithms.

Figure 5:
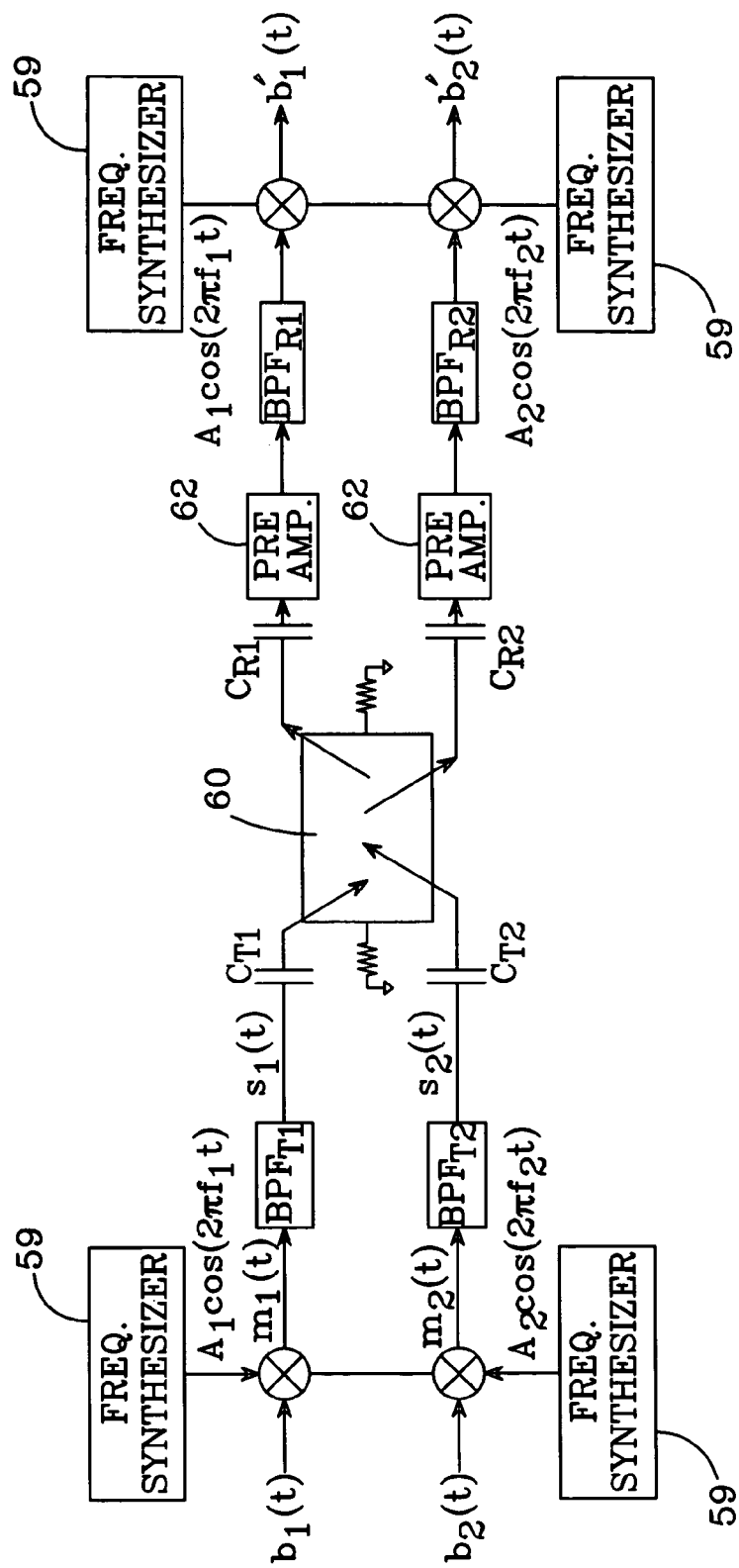
FIG. 5 is a diagram of a wireless interconnection system which utilizes a FDMA algorithm.

When using a FDMA algorithm, the system's bandwidth is divided into separate frequency bands, each of which carries one or more signals. For example, for a system with a total bandwidth of 105 GHz, frequency bands of I/O channels may be allocated between 5-105 GHz with bandwidths of 5~20 GHz for each channel, thereby providing a minimum data rate of 5~40 Gbps, depending on the modulation scheme. An exemplary system which employs FDMA modulation and demodulation for two signals is shown in FIG. 5. Two signals to be conveyed, $b_1(t)$ and $b_2(t)$, are multiplied by sinusoidal carriers such as $A_1 \cos(2\pi f_1 t)$ and $A_2 \cos(2\pi f_2 t)$, respectively, where $A_1$ and $A_2$ are the amplitudes and $f_1$ and $f_2$ are the frequencies of the respective carriers; the carriers may be generated, for example, by one or more frequency synthesizers 59. The resulting signals $m_1(t)$ and $m_2(t)$ are filtered through bandpass filters $BPF_{T1}$ and $BPF_{T2}$—which have unique passbands—to form functions $s_1(t)$ and $S_2(t)$. The FDMA-modulated signals are eventually coupled into a shared wireless transmission medium 60 (preferably terminated at both ends as described above) via capacitive couplers $C_{T1}$ and $C_{T2}$.

On the receiver side, the process is reversed. Capacitive couplers $C_{R1}$ and $C_{R2}$ couple the modulated signals from medium 60 to the receivers, which can include preamplifiers 62 and respective bandpass filters $BPF_{R1}$ and $BPF_{R2}$. The filtered signals are demodulated by mixing them with the modulating carriers, thereby reconstructing input signals $b_1(t)$ and $b_2(t)$, labeled here as $b_1'(t)$ and $b_2'(t)$.

Preamplifiers 62 preferably have gains on the order of 20-30 dB. Balanced or double balanced active mixers, such as Gilbert cells, may be used for modulation and demodulation. It is advantageous to use a non-coherent detection scheme, such as frequency shift keying (FSK), for simple receiver implementation.

Figure 6:
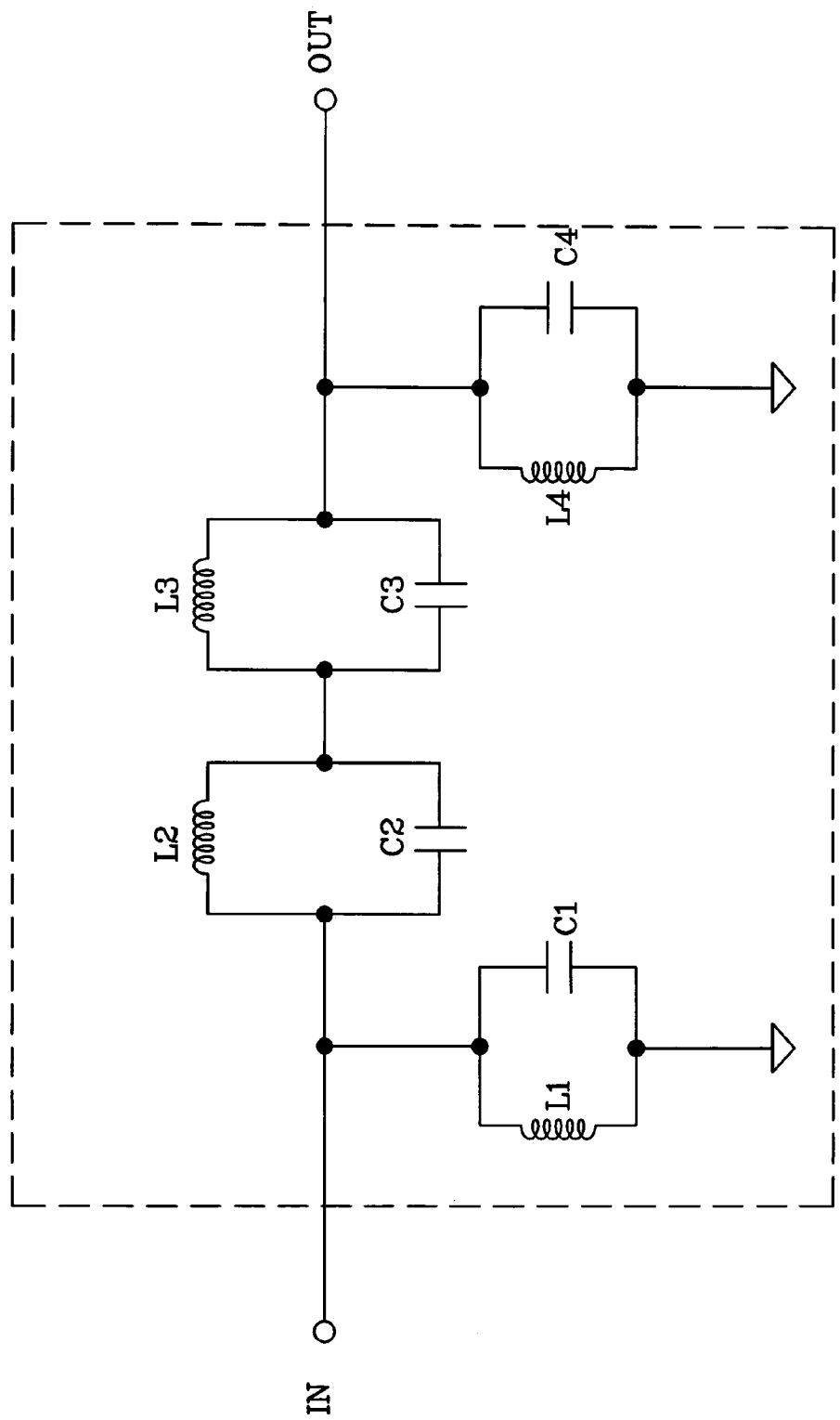
FIG. 6 is a schematic diagram of an embodiment of a bandpass filter suitable for use with the system of FIG. 3.

Bandpass filters $BPF_{T1,T2,R1,R2}$ are needed to minimize cross-band interference, and are preferably low-loss and highly-selective filters. One filter which meets these criteria uses a transformer-type inductor design, in which the lost energy is recovered via a secondary inductor with delayed phase angles to attain extremely high Q (>1000) inductance and high tunability (0-100%). A elliptical filter based on this technique is shown in FIG. 6. Simulations indicate that, using exemplary component values as follows:

L1=0.41 nH, Q=50; C1=2.6 pF

L2=0.39 nH, Q=50; C2=1.5 pF

L3=0.72 nH, Q=50; C3=2.7 pF

L4=0.41 nH, Q=50; C4=2.6 pF provides a 5 GHz filter with a 2 GHz bandwidth, a 1 dB passband insertion loss, and 22 dB stopband rejection.

FDMA algorithms are well-known; they are described in, for example, Razavi, *RF Microelectronics*, Prentice-Hall (1998), pp. 105-110.

Figure 7:
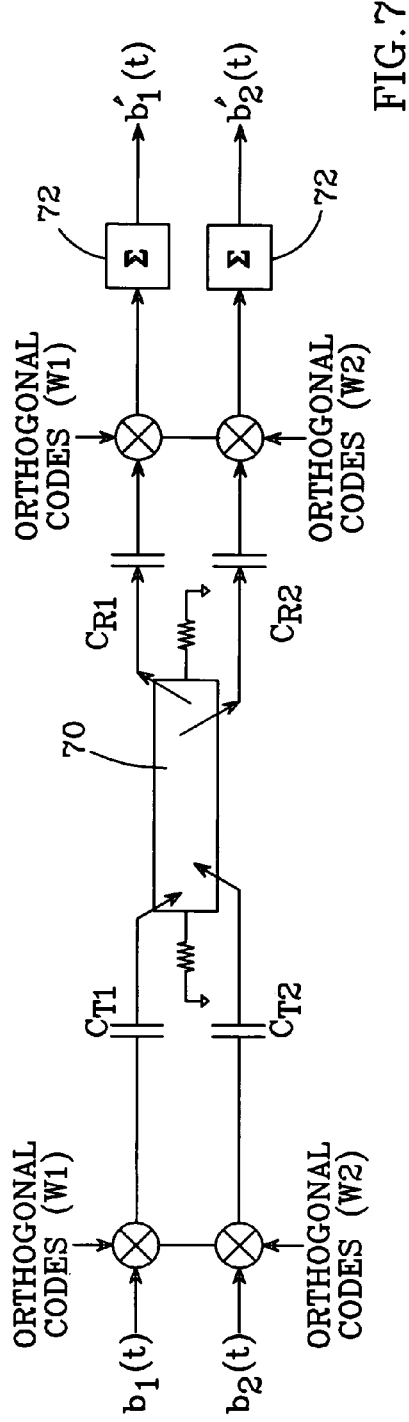
FIG. 7 is a diagram of a wireless interconnection system which utilizes a CDMA algorithm.

An exemplary system which employs CDMA modulation and demodulation for two signals is shown in FIG. 7. Two signals to be conveyed, $b_1(t)$ and $b_2(t)$, are first spread by orthogonal codes, such as Walsh codes (W1 and W2). The modulated signals are capacitively coupled into a properly terminated shared wireless transmission medium 70 with capacitive couplers $C_{T1}$ and $C_{T2}$, where they are linearly superposed and broadcasted to receivers. Capacitive couplers $C_{R1}$ and $C_{R2}$ at the receiver end couple the signals from medium 70 to mixers which de-spread the signals using the same orthogonal codes (W1 and W2); the de-spread signals are passed through respective correlators 72 to recover $b_1(t)$ and $b_2(t)$ (labeled $b_1'(t)$ and $b_2'(t)$).

Using CDMA modulation permits the system to be easily reconfigured. By making the spreading codes programmable, such that they can be changed using software commands, for example, the destination of a signal can be changed. The simple reconfigurability of the present invention represents a significant advantage over other interconnection methods. Wired interconnects require the use of physical switches to redirect a signal from one destination to another. Here, a signal's destination is changed by simply changing its modulating code, which can even be done on-the-fly.

Figure 8:
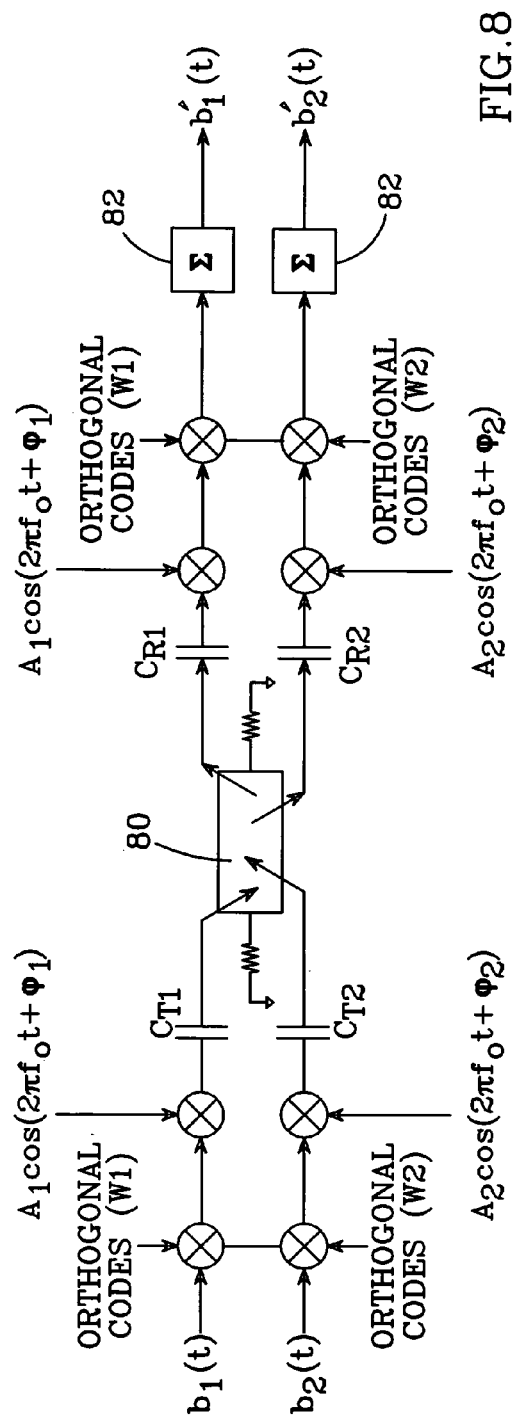
FIG. 8 is a diagram of an alternative embodiment of a wireless interconnection system which utilizes a CDMA algorithm.

A CDMA algorithm may also be used beyond the baseband by modulating CDMA-modulated signals with RF carriers, as shown in FIG. 8. Here, incoming signals $b_1(t)$ and $b_2(t)$ are spread by respective orthogonal codes such as Walsh codes W1 and W2, and modulated with RF carriers such as $A_1\cos(2\pi f_0 t+\Phi_1)$ and $A_2\cos(2\pi f_0 t+\Phi_2)$, before being coupled to shared wireless transmission medium 80 via capacitive couplers $C_{T1}$ and $C_{T2}$. At the receiver end, the signals are coupled from medium 80 via capacitive couplers $C_{R1}$ and $C_{R2}$, demodulated and de-spread using the same RF carriers and orthogonal codes used on the transmitter side, and fed to correlators 82 to recover $b_1(t)$ and $b_2(t)$ (labeled $b_1'(t)$ and $b_2'(t)$). In this case, both coherent demodulation and sequence timing acquisition and tracking are used for signal recovery.

Several parameters should be considered if implementing the present invention with CDMA modulation, including the number of I/Os (i.e., the system capacity), bit rate (i.e., the transmitted signal rate), and bit error rate (BER). For example, assume the transmitted power of each transmitter is well controlled and all signals are received with equal power. If the conveyed signals are modulated with orthogonal codes and the system is operated under a synchronous access condition, the total number of I/Os is limited only by the spreading factor N, as given by:

$$N = \frac{F_c}{F_s} = \frac{T_s}{T_c} = G \quad (3)$$

where N is equivalent to the CDMA processing gain G, $F_S$ is the symbol rate (or CDMA sub-channel data rate), $F_C$ is the chip (or clock) rate of the spreading code, $T_S$ is the symbol clock period, and $T_C$ is the chip clock period; the BER of the wireless interconnect system is totally determined by the signal-to-noise ratio (SNR) of the receiver.

Simulations have been performed in which Walsh codes were chosen as the spreading code sequence, and a processing gain of 20 and synchronous access were assumed. The use of Walsh codes limits the number of I/O channels to 20. These simulations indicate that the system reaches an extremely low BER ($<10^{-14}$) as SNR>15 dB.

Figure 9A:
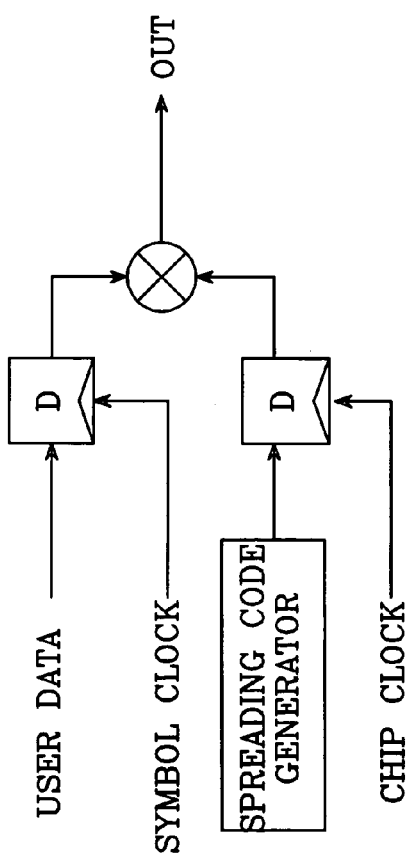
FIG. 9a is a diagram of the baseband portion of a CDMA transmitter.
Figure 9B:
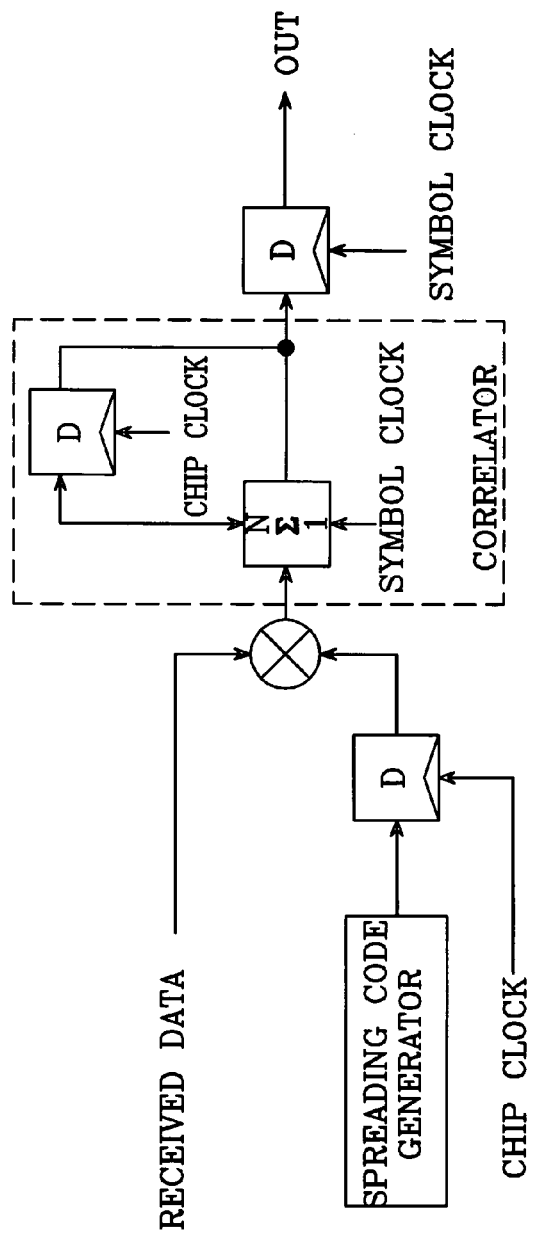
FIG. 9b is a diagram of the baseband portion of a CDMA receiver.

The baseband (digital part) of a CDMA-interconnect transceiver is shown in FIGS. 9a (transmitter side) and 9b (receiver side). As shown in FIG. 9a, user data and the spreading codes are clocked into respective D flip-flops with a symbol clock and a chip clock, respectively, and the outputs of the flip-flops are mixed and fed to either a capacitive coupler or RF modulator. In FIG. 9b, the spreading codes are clocked into a D flip-flop with the chip clock, the output of the flip-flop and the received signal (from either a capacitive coupler or RF demodulator) are mixed and fed to a correlator. The correlator output is provided to a D flip-flop clocked by the symbol clock to reconstruct the conveyed signal.

CDMA algorithms are well-known; they are described in, for example, Viterbi, *CDMA—Principles of Spread Spectrum Communication*, Addison-Wesley Longman, Inc. (1995), pp. 2-9.

The synchronous access condition is fulfilled if the signal traveling distance during one $T_C$ is larger than the longest span between any two transmitters coupled to the same shared wireless transmission medium. Assuming a data rate of 20 Gbps, the maximum synchronous access distance between any two transmitters is limited to about 0.7 cm.

In order to maintain flexibility in locating transmitters geographically and high overall data rate and spectrum efficiency of the wireless interconnect system, a FDMA/CDMA combined access system may be employed. In this system, frequency bands are divided by using different RF carriers, while I/O data are spread within individual frequency bands using orthogonal codes. For example, an FDMA algorithm may be used to divide a 100 GHz bandwidth into five 20 GHz bands, each of which holds 4 CDMA I/O sub-channels. Each sub-channel then operates at a bit rate of 5-10 Gbps, according to the modulation scheme.

Figure 10:
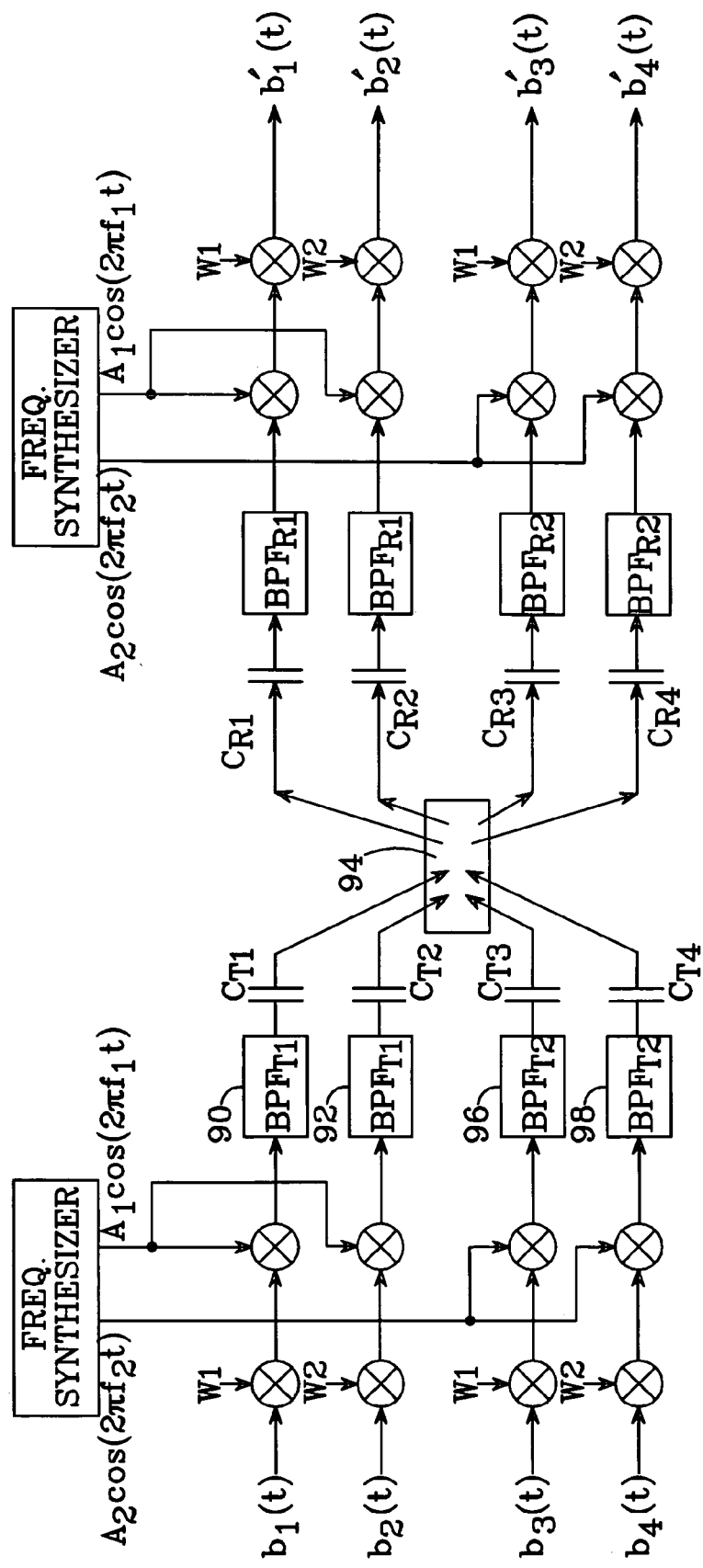
FIG. 10 is a diagram of a wireless interconnection system which utilizes both FDMA and CDMA algorithms.

An exemplary FDMA/CDMA combined access system is shown in FIG. 10. In this four input signal example, two input signals $b_1(t)$ and $b_2(t)$ are spread using respective unique orthogonal codes (W1 and W2), multiplied by a RF sinusoidal carrier (e.g., $A_1\cos(2\pi f_1 t)$), and bandpass filtered using filters 90, 92 having a common passband, thereby allocating $b_1(t)$ and $b_2(t)$ to one frequency band. The CDMA and FDMA-modulated signals are then coupled to a shared wireless transmission medium 94 via capacitive couplers $C_{T1}$ and $C_{T2}$. Similarly, input signals $b_3(t)$ and $b_4(t)$ are spread using respective orthogonal codes (e.g., W1 and W2), multiplied by a RF carrier (e.g., $A_2\cos(2\pi f_2 t)$), and bandpass filtered using filters 96, 98, thereby allocating $b_3(t)$ and $b_4(t)$ to a second frequency band. These signals are coupled to medium 94 via capacitive couplers $C_{T3}$ and $C_{T4}$.

On the receiver side, the propagating signals are coupled from medium 94 via capacitive couplers $C_{R1}$-$C_{R4}$, passed through respective bandpass filters and demodulated with signals $A_1\cos(2\pi f_1 t)$ and $A_2\cos(2\pi f_2 t)$, and de-spread with the orthogonal codes with which they were modulated, thereby providing reconstructed versions of input signals $b_1(t)$-$b_4(t)$ (labeled here as $b_1'(t)$-$b_4'(t)$).

With a FDMA/CDMA combined access system as described above, the RF transceivers may be designed to operate in each of the separate 20 GHz bands, in which case the transceiver's digital circuits are only required to clock at 20-40 Gbps within each band. Thus, this architecture provides a 100 GHz bandwidth interconnect scheme, while reducing the complexity of the transceiver and digital circuit designs. In the absence of such an arrangement, the transceivers must operate over the complete 100 GHz bandwidth, with digital circuits clocked up to 100-200 Gbps for an equivalent interconnect data throughput.

Signal-to-noise ratio considerations impose a limit on the transmission distance for signals at a given frequency. However, transmitter/receiver repeaters my be utilized if longer synchronous access distances are needed. A random or asynchronous access process should be avoided, to simplify the transmitter/receiver architecture and circuit implementation.

A wireless communication system per the present invention can be implemented using silicon-based CMOS technology. The invention may be packaged in any number of ways, including multi-chip modules (MCMs) and flip-chips. A flip-chip arrangement, for example, locates the IC dies on top and the wireless transmission medium on the bottom, with the medium bonded to the ICs via bonding pads that form respective capacitive couplers when bonded.

To reduce power consumption, clustered transmitters within the synchronous access range may share a common RF transmitter, while clustered receivers may share a common RF receiver, without sacrificing channel reconfigurability. The only non-sharable circuitry is the digital portions of the transceivers; however, the real estate and power consumption needs of these circuits are virtually insignificant when implemented using CMOS technology.

As noted above, the invention offers many advantages over conventional interconnection schemes. In addition, the invention also facilitates the non-invasive testing of dies within a package, eliminating the need to connect wire bonds to the dies.

Figure 11:
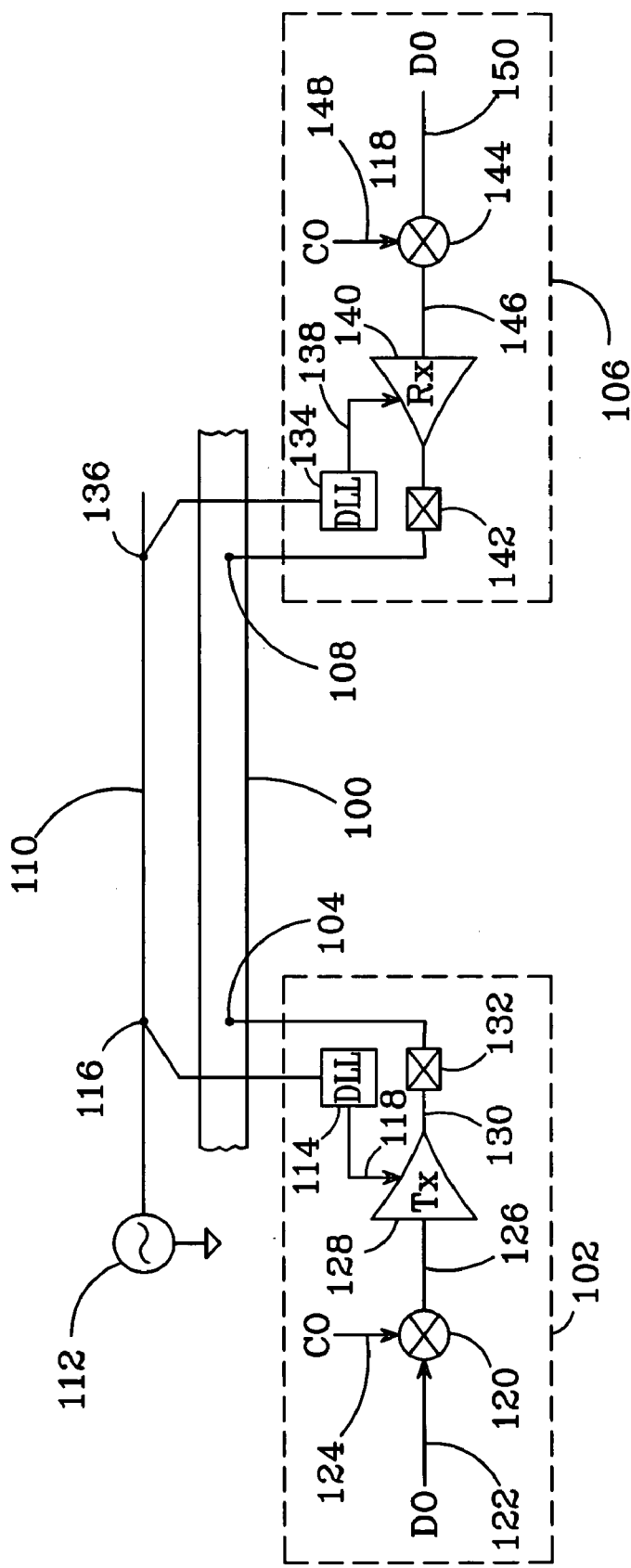
FIG. 11 is a block diagram illustrating the basic principles of an SS-CDMA bus interface per the present invention.

The basic principles of a source synchronous CDMA (SS-CDMA) bus interface in accordance with the present invention are shown in FIG. 11. The interface provides a single data channel 100 (typically a transmission line), a data transmitter circuit 102 coupled to the data channel at a first point 104, a data receiver circuit 106 coupled to the data channel at a second point 108, and a system clock line 110 which runs adjacent and parallel to the data channel. A system clock signal 112 is applied to system clock line 110 such that the system clock signal propagates in parallel with data sent by data transmitter circuit 102 to data receiver circuit 106 via data channel 100.

Data transmitter circuit 102 comprises a clock signal generating circuit 114 coupled at its input to system clock line 110, at a point 116 approximately adjacent to the point 104 at which data transmitter circuit 102 is coupled to data channel 100. Clock generating circuit 114, preferably a delay-locked loop (DLL) or phase-locked loop (PLL), is arranged to generate a first clock signal 118 derived from system clock signal 112. A modulating circuit 120 is connected to receive base-band data (D0) to be transmitted at a first input 122 and a unique orthogonal code (C0) at a second input 124 and to produce data modulated by said unique orthogonal code at an output 126. A transmitter 128 receives the modulated data and first clock 118 at respective inputs, and is arranged to use the first clock to align the modulated data with system clock signal 112. Transmitter 128 provides the aligned modulated data at an output 130, which is coupled to data channel 100—typically via an I/O pad 132—such that the aligned modulated data is transmitted using source synchronous (SS) clocking.

Data receiver circuit 106 comprises a clock signal generating circuit 134 coupled at its input to system clock line 110 at a point 136 approximately adjacent to the point 108 at which data receiver circuit 106 is coupled to data channel 100. Clock signal generating circuit 134, preferably a DLL or PLL, is arranged to generate a second clock signal 138 derived from system clock signal 112. A receiver 140 receives the aligned modulated data from data channel 100 (typically via an I/O pad 142) and second clock 138 at respective inputs, and is arranged to use the second clock to align the received data with the system clock signal. A demodulating circuit 144 receives the aligned received data at a first input 146 and an orthogonal code (C0) at a second input 148, and to produce data demodulated with the orthogonal code at an output 150.

In operation, if the orthogonal code used to modulate data D0 and the orthogonal code used to demodulate the aligned received data produced by receiver 140 are the same (i.e., both are C0), the demodulated data will be the same as the modulated data (i.e., both are D0). In this way, data D0 is transmitted from one location to another via data channel 100.

The present SS-CDMA bus interface is suitably employed to transmit two or more separate data bits through the same channel simultaneously, and successfully recover them. FIGS. 12a-12c illustrate three possible SS-CDMA bus interface architectures, for 2-to-2 on- and off-chip I/Os, which enables two separate data streams (interchangeably referred to herein as D0 and D1, and D0(t) and D1(t)) to be transmitted at the same time on a single data channel 200. Both ends of data channel 200 are preferably parallel terminated (e.g., Vt=1.4V). A single system clock line 202 is adjacent and parallel to data channel 200; it preferably runs in a first direction 204 parallel to the data channel, then reverses direction and runs in the opposite direction 206 parallel to the data channel; clock line 202 propagates a system clock signal 208.

Transceivers 210 and 212 couple data to and from data channel 200. In FIG. 12a, transceiver 210 is configured as a "slave" and transceiver 212 is configured as a "master"; a slave device might be interfaced, for example, to a DRAM chip, while a master device might be interfaced, for example, to a CPU or a memory controller. Master and slave devices might be configured as transceivers, or might alternatively be configured to just transmit or just receive. Note that though master/slave configurations are depicted in FIGS. 12a-12c, the present bus interface has a general applicability. For example, the bus interface might convey data between two masters, between two slaves, between dedicated transmitters and receivers, etc.

FIG. 12a illustrates an SS-CDMA bus interface which provides re-configurable multiple access between one slave (with two transmitters) and one master (with two receivers). Slave 210 comprises two modulating circuits 213 and 214, two transmitters Tx0 and Tx1, and a DLL clock generating circuit 216. Modulating circuits 213 and 214 receive two separate base-band data streams (D0(t) and D1(t)) and modulate them with orthogonal codes C0(t) and C1(t), respectively (interchangeably referred to herein as C0 and C1, and C0(t) and C1(t)). Transmitters Tx0 and Tx1 couple the modulated data streams to data channel 200 (via an I/O pad 218), which propagates them to master 212—preferably using single-ended 3-level signaling.

In order to avoid mutual interference on data channel 200, 2-bit orthogonal Walsh codes are preferably used to separate individual data streams while they simultaneously occupy the same data channel. Master 212 comprises two demodulating circuits 220 and 222, two receivers Rx0 and Rx1, and a DLL clock generating circuit 224. Receivers Rx0 and Rx1 couple the modulated data streams from data channel 200 (via an I/O pad 226) to demodulating circuits 220 and 222, which demodulates them with orthogonal codes C0(t) and C1(t), respectively, (the same codes used to modulate D0(t) and D1(t)) to recover D0(t) and D1(t).

FIG. 12b illustrates an SS-CDMA bus interface which provides re-configurable multiple access between two slave devices 230, 232 and one master 234 (with two receivers Rx0 and Rx1), with slaves 230 and 232 coupling their modulated data to data channel 200 at different locations. Here, slave 230 modulates data stream D0(t) and couples the modulated 2-level data to a point 'A' on data channel 200, and slave 232 modulates data stream D1(t) and couples the modulated data to a point 'B' on data channel 200, where it is superposed with the propagating D0 data to create a superposed 3-level signal which is transmitted to master 234. Since source synchronous clocking is used, the board-level skew between clock (i.e., clock to master) and data is removed and multi-level superposition capability is achieved. At master 234, Rx0 and Rx1 simultaneously recover D0(t) and D1(t), respectively (using orthogonal codes C0(t) and C1(t), respectively).

FIG. 12c shows re-configurable multiple access between two slaves (236, 238) which couple their respective modulated data streams (D0(t), D1(t)) to data channel 200 at points A and B, and two masters (240, 242) which couple data from channel 200 to their receivers at points C and D. While receiver Rx0 of master 240 recovers D0(t), receiver Rx1 of master 242 recovers D1(t)—after the channel delay that arises as the superposed data propagates from C to D.

Reconfigurability is achieved entirely in software, by simply changing the orthogonal codes used to modulate and demodulate a given data stream, typically under the control of a system controller 244 (shown in FIG. 12a). Thus, the present SS-CDMA bus interface provides real-time I/O reconfigurability and simultaneous multi-chip access capability. A traditional narrow channel high-speed bus tends to have higher data bus latency, because it has a longer end-to-end request time than that of a wide channel. However, the SS-CDMA bus interface avoids high data bus latency by sharing the same channel at the same time.

Another advantage provided by the present invention is its use of 3-level signaling for four (2-to-2) off-chip multiple access. A conventional bus providing this capability would typically employ un-coded 4-PAM (4 voltage level) signaling, which results in a smaller voltage noise margin and/or more channel power consumption when compared to the present invention.

Note that the present SS-CDMA bus interface could be adapted to provide higher levels of multiple access. For example, the interface could be used for eight (4-to-4) off-chip multiple access; this would require 5-level signaling.

The invention is also adaptable to fully bidirectional communications. Since system clock line 202 runs in both directions 204 and 206, data can be sent via the present bus interface in either direction. To provide source synchronous clocking, the DLL for a transmitter transmitting in direction 204 must derive its clock by coupling to the portion of system clock line 202 that runs in direction 204, while the DLL clock for data transmitted in the opposite direction must be derived from the portion of system clock line 202 that runs in direction 206.

Figure 13:
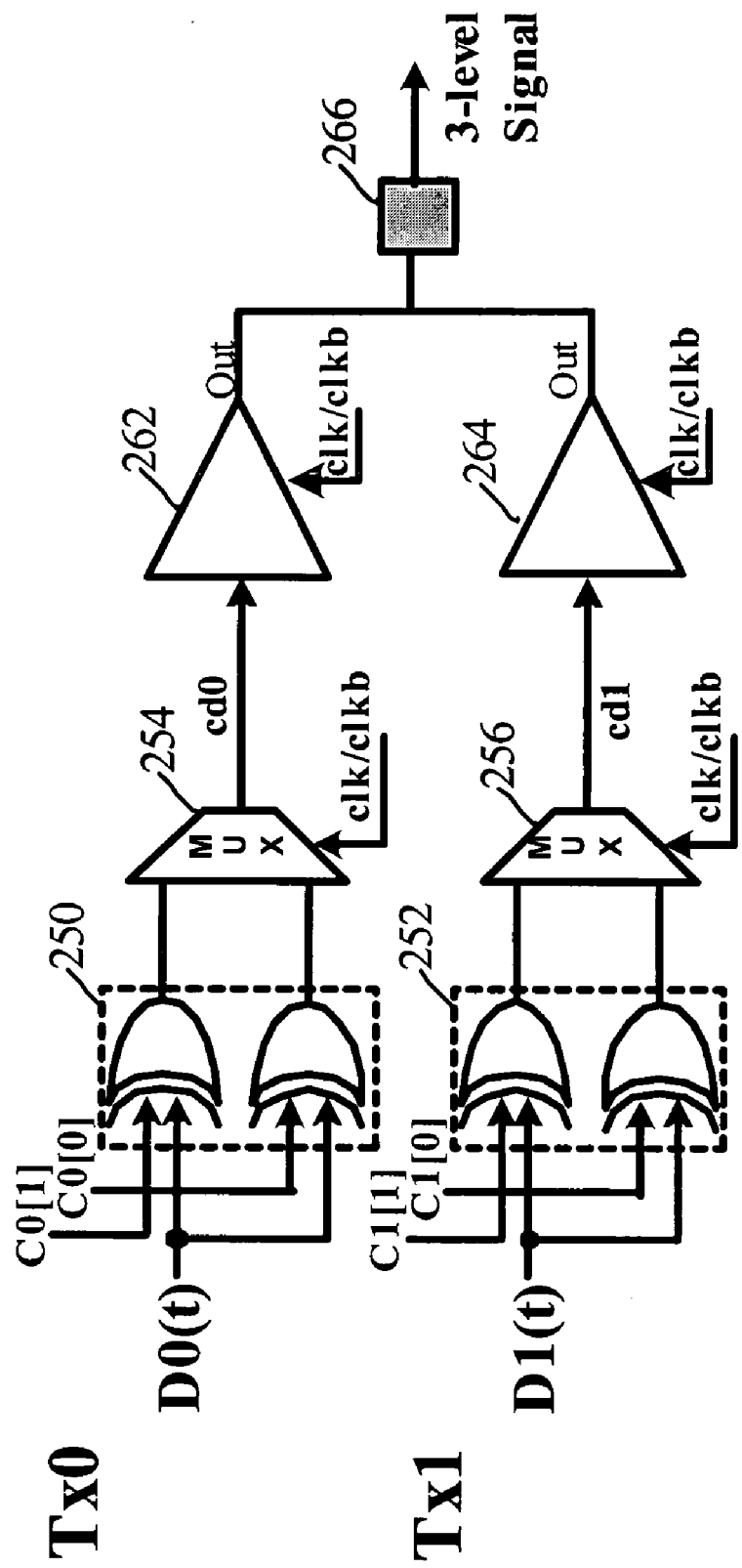
FIG. 13 is a schematic diagram of a transmitter circuit as might be used with an SS-CDMA bus interface per the present invention.

One possible implementation of a transmitter circuit suitable for use in the present bus interface is shown in FIG. 13, which depicts an exemplary 2-bit embodiment that includes transmitters Tx0 and Tx1. The modulators 250, 252 are preferably implemented with exclusive-OR gates, the outputs of which (cd0(t)=D0(t)⊕C0(t) and cd1(t)=D1(t)⊕(t)) are routed through multiplexers 254 and 256 to output drivers 262 and 264. The multiplexers and output drivers are preferably clocked with the dual edge of the DLL clock (clk/clkb for even/odd data) derived from system clock 208; this provides a data rate of 2 Gb/s/pin for a 1 GHz DLL clock. The driver outputs are connected together at an I/O pad 266 to produce the 3-level output signal coupled to data channel 200. The output drivers preferably have a current-mode open-drain structure. The spread data, cd0(t) and cd1(t), occupy twice the bandwidth of the base-band data, and thus the bandwidth expansion factor of 2 makes the timing margin weaker.

FIGS. 14a and 14b show output waveforms for handling 2 bits of data simultaneously. FIG. 14a depicts the output waveform for a conventional system, which covers the states of 2 bits sent simultaneously with 4-PAM signaling. Assuming there are 600 mv to work with, this approach uses three 200 mV data eyes for 2 bits of information. FIG. 14b depicts the corresponding output waveform for the present SS-CDMA bus interface, which, assuming 600 mv to work with, employs four 300 mV data eyes for the same data rate—such that the voltage margin is improved with respect to the conventional system. FIG. 14c shows the simulated data eye of FIG. 14b on an unloaded bus at 2 Gb/s/pin.

Figure 15:
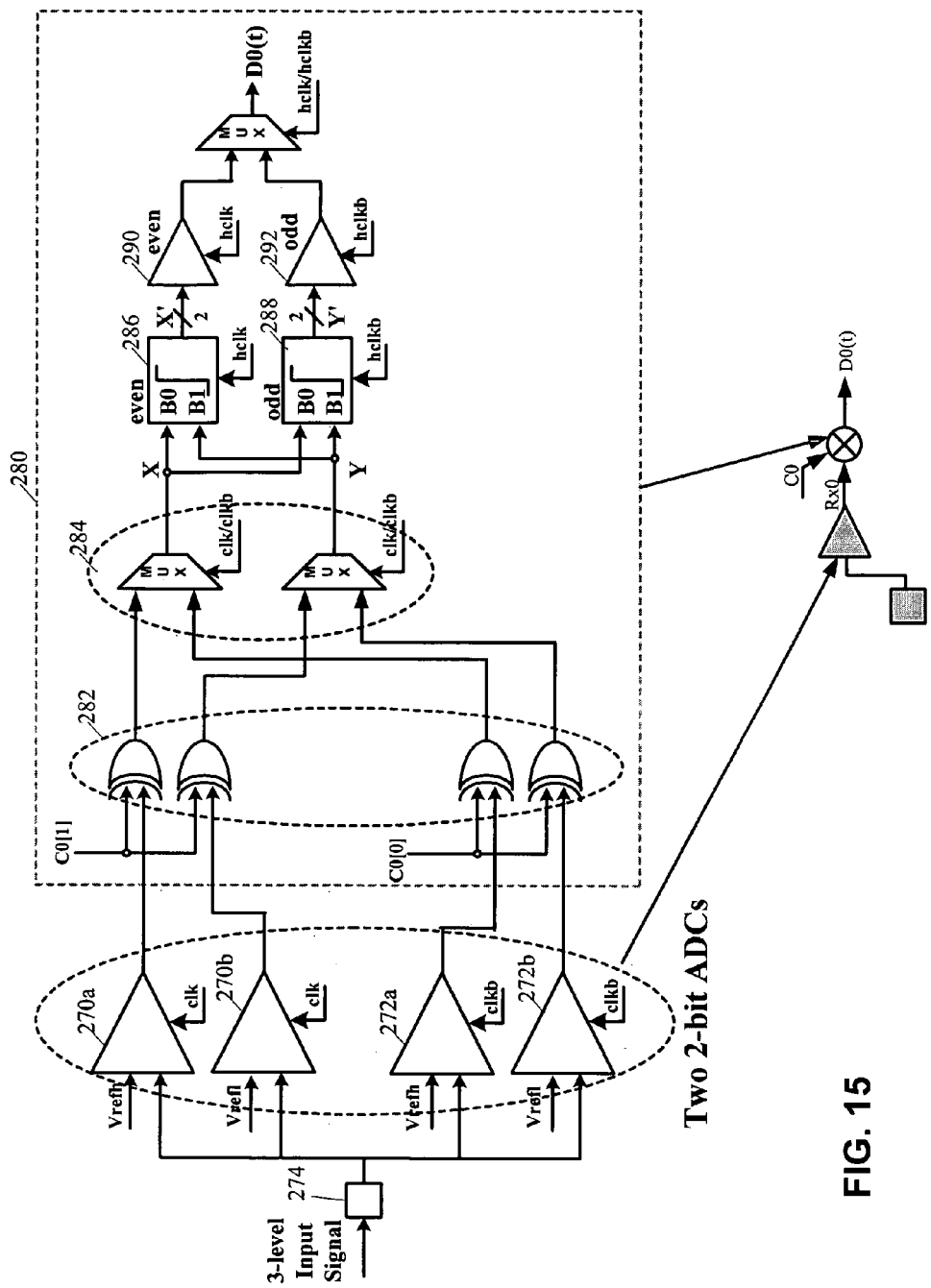
FIG. 15 is a schematic diagram of a receiver circuit as might be used with an SS-CDMA bus interface per the present invention.

One possible implementation of a receiver circuit suitable for use in the present bus interface is shown in FIG. 15, which depicts the circuitry needed to recover one modulated data stream (D0(t) in this example). Receiver Rx0 preferably consists of two 2-bit interleaving analog-to-digital converters (ADCs): one 2-bit ADC made from two comparators 270a and 270b (for even data), and the other made from comparators 272a and 272b (for odd data). ('Even' and 'odd' simply refer to the every other bit in a given data stream. For example, if D0(t)=[a0, b0, a1, b1, a2, b2, ... ], the even data=[a0, a1, a2, ... ] and the odd data=[b0, b1, b2, ... ]). Each ADC receives the 3-PAM signal from data channel 200 via an I/O pad 274. To discriminate between the 3 voltage levels, one comparator of each ADC receives a DC reference voltage Vrefh, and the ADC's other comparator receives a DC reference voltage Vrefl. The ADC outputs are provided to demodulator 280, which preferably includes exclusive-or gates 282. To recover the separate data streams from the composite spectrum, each ADC preferably converts the incoming 3-level signal to thermometer code, and then the exclusive-or gates de-spread the thermometer code by using the same orthogonal Walsh codes (C0[0], C0[0], C1[0], C1[1]) used to modulate the data.

The de-spread data is preferably multiplexed (via multiplexers 284), and the multiplexed data (X and Y) is fed to integrators 286, 288, which integrate X and Y to provide differential outputs X' and Y'. Outputs X' and Y' are preferably provided to sense amp-based flip-flops (SAFF) 290, 292, which amplify and latch (using synchronous clocking) the small swing differential integrator output. The outputs of SAFF 290, 292 are multiplexed to produce the recovered original data D0(t). The ADCs and demodulators are synchronized with, for example, a 1 GHz clock (clk/clkb), with the integrators and SAFF using a 500 MHz clock (hclk/hclkb); both clocks are generated from the data receiver circuit's DLL to provide a data rate of 2 Gb/s/pin. The two 2-bit interleaving ADCs achieve an effective throughput rate of 2 Gsamples/s.

Figure 16:
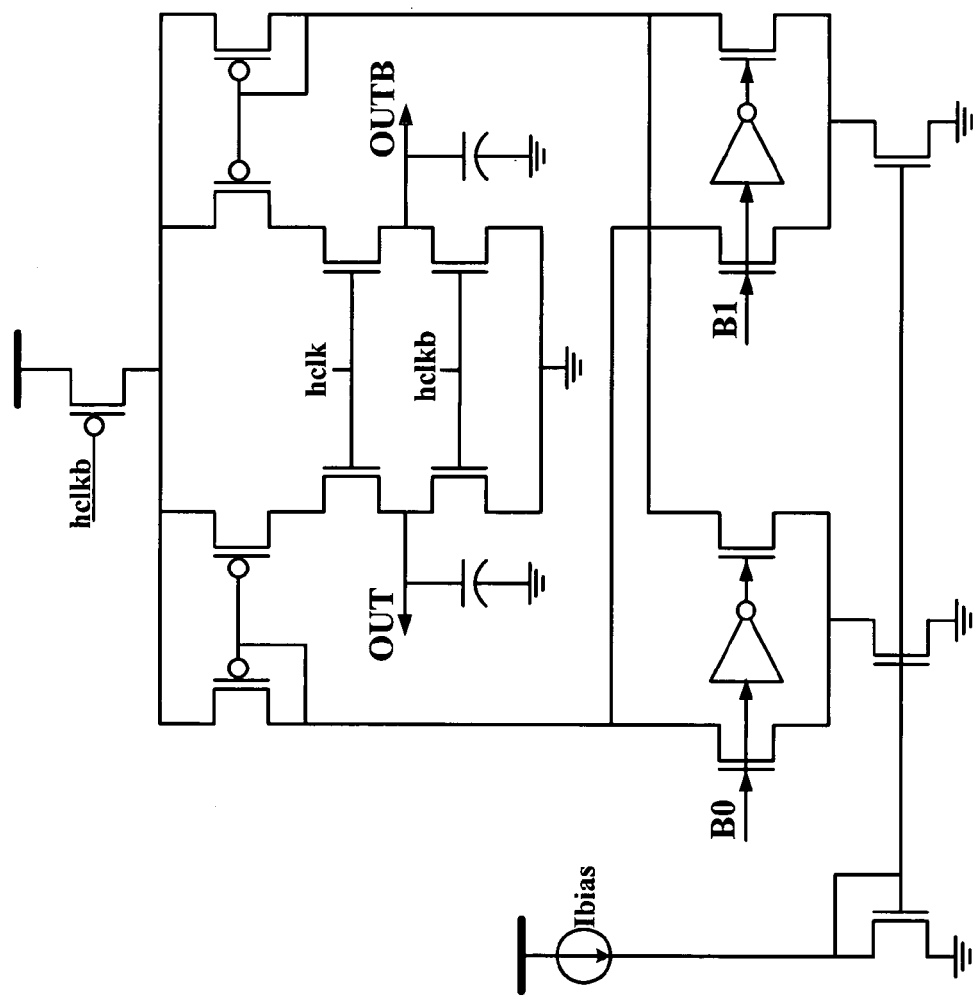
FIG. 16 is a schematic diagram of an integrator circuit as might be used with the receiver circuit of FIG. 15.

A preferred embodiment of an integrator suitable for use with the present invention is shown in FIG. 16. At every two integration periods, the integrator averages and determines the value of the demodulated data (as shown in more detail below in FIG. 18. The integrator receives multiplexed despread data X and Y at its B0 and B1 inputs, and produces a differential output (X' or Y') at its OUT and OUTB outputs.

Figure 17:
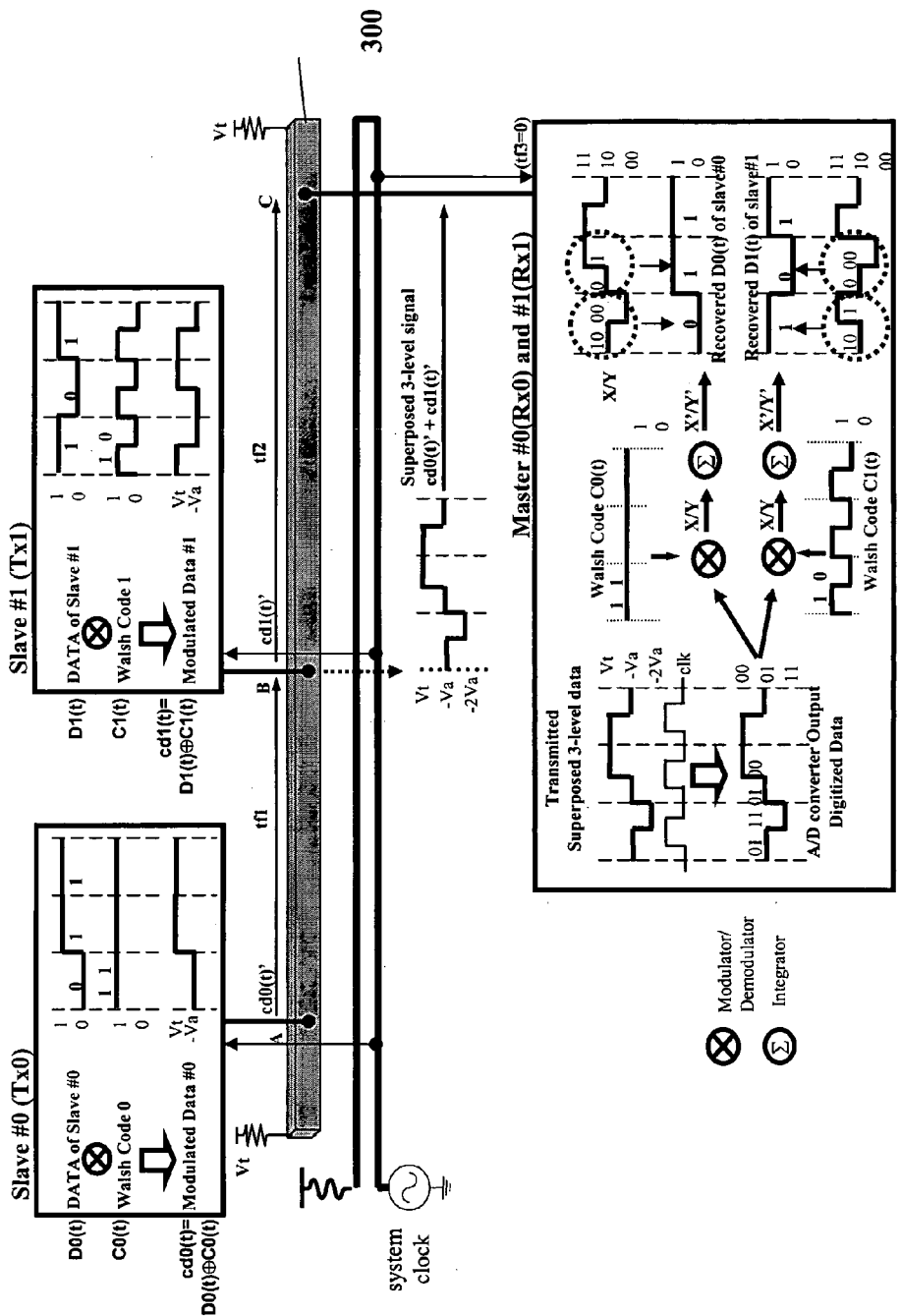
FIG. 17 illustrates the operation of an SS-CDMA bus interface per the present invention to provide 2-to-2 simultaneous multi-chip access.
Figure 18:
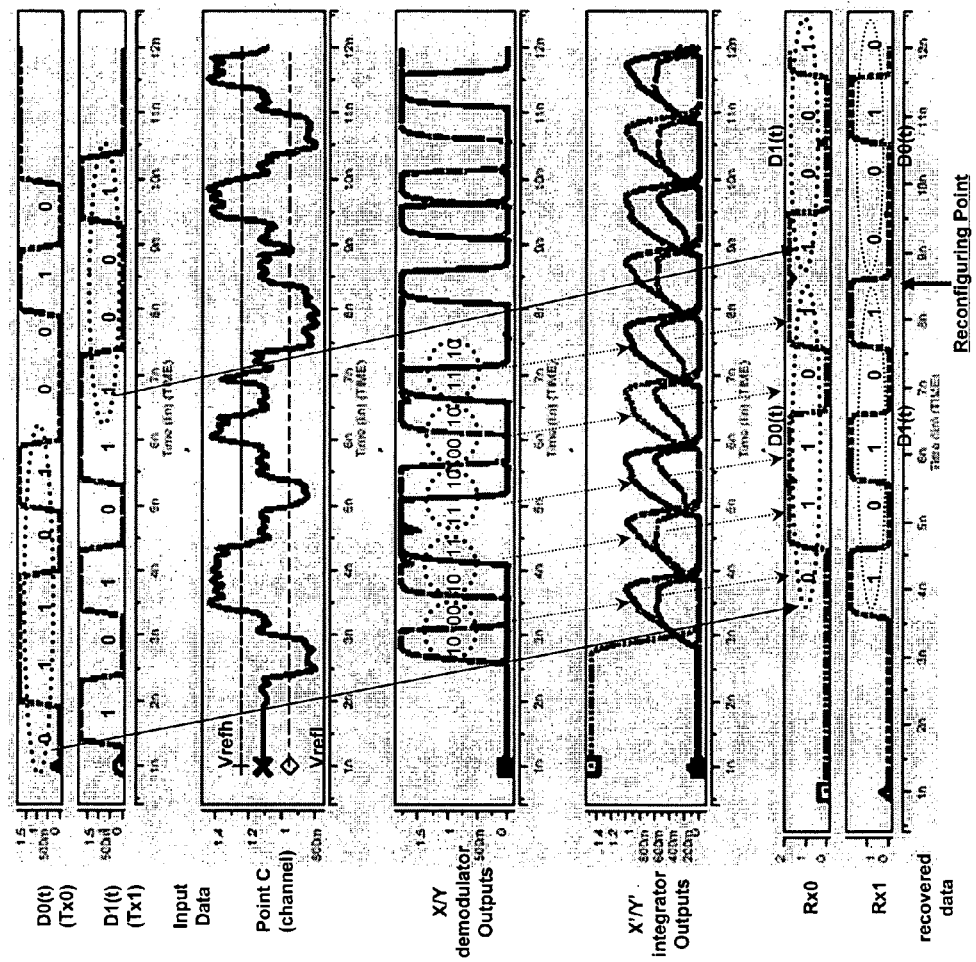
FIG. 18 depicts timing diagram associated with the operation of an SS-CDMA bus interface per the present invention.

FIGS. 17 and 18 illustrate the detailed operation of the present SS-CDMA bus interface for four (2-to-2) off-chip multiple access. Here, there are two "slave" chips (Slave #0 and Slave #1), which contain respective transmitter circuits (Tx0 and Tx1) as described above, and are connected to a single data channel 300 at locations 'A' and 'B', respectively. Data D0(t) is modulated with 2-bit orthogonal Walsh code C0(t) [1,1 in this example] to produce modulated output cd0(t), and data D1(t) is modulated with 2-bit orthogonal Walsh code C1(t) [1,0] to produce modulated output cd1(t). Modulated output cd0(t) is coupled to data channel 300 (where it becomes cd0(t)') at point 'A', and modulated output cd1(t) is coupled to data channel 300 (where it becomes cd1(t)') at point 'B'.

After a channel delay of tfl, the transmitted signal cd0(t)' arrives at point B, at which time slave #1 sends cd1(t)'. The two signals, cd0(t)'+cd1(t)', are superposed and then transmitted to a master (masters #0 and #1) using source synchronous signaling; masters #0 and #1 are connected to channel 300 at a point 'C'. Masters #0 and #1 contain data receiver circuits Rx0 and Rx1 as described above. After a channel delay of tf2, the superposed data reaches point C, where it is digitized by the ADCs and then de-spread by the same Walsh codes used to modulate the data (C0(t) and C1(t)). The demodulators' X and Y outputs are integrated by the integrators to produce the differential signal X' for even data and Y' for odd data, from which D0(t) and D1(t) are recovered.

FIG. 18 depicts timing diagrams which illustrate the simulated operation of the SS-CDMA bus interface of FIG. 17, for a data rate of 2 Gb/s/pin with tf1=0.4 ns, tf2=0.6 ns, tf3 (the channel delay between point C and the masters)=0 ns, and an internal receiver latency of about 1.2 ns. The two masters are in the same position for simplicity. In this example, the Walsh codes provided to the demodulators are changed at a time labeled "reconfiguring point", at which point the outputs of Rx0 and Rx1 are changed from D0(t) to D1(t) and from D1(t) to D0(t), respectively, at the same time.

Figure 19:
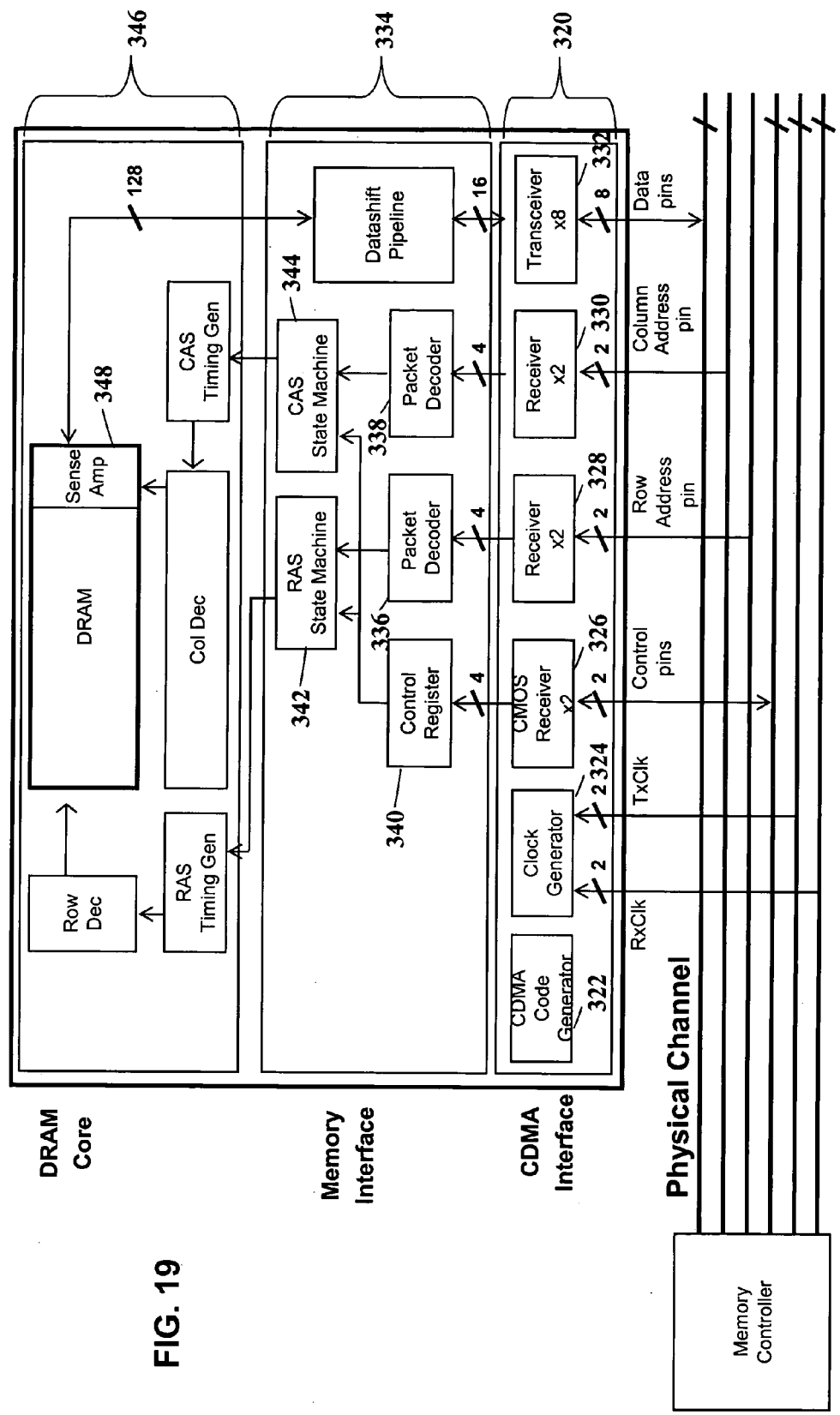
FIG. 19 is a block diagram of a DRAM system which employs an SS-CDMA bus interface per the present invention.

FIG. 19 shows a block diagram of one possible embodiment of a CDMA DRAM system that utilizes the present SS-CDMA bus interface as a memory bus. This CDMA DRAM is divided into three parts. The first part is the CDMA interface 320, which includes a CDMA code generator 322, a clock generator (i.e. DLL, PLL or CDR) 324, 4 CMOS receivers 326 for control pins, 4 receivers 328, 330 for address pins, and 8 transceivers 332 for data pins. In contrast to prior art D-RDRAM system, only 4 receivers are required for row and column addresses, and only 8 transceivers are needed for 16 bits of data transfer. The CDMA code generator 322 is preferably either a Walsh code generator or a M-sequence generator, which generates the spreading codes for the transceivers' modulators and demodulators.

The second part is a memory interface section 334, which contains packet decoders 336, 338, control registers 340, and state machines 342, 344. This section takes an input request packet from the CDMA interface and determines if the request is for this device, and if it is, starts the internal access and delivers the data to the pins at the correct time.

The third part is a DRAM core section 346, which preferably provides bandwidth into and out of the DRAM sense amplifier 348 greater than the bandwidth provided by conventional DRAMs.

Figure 20:
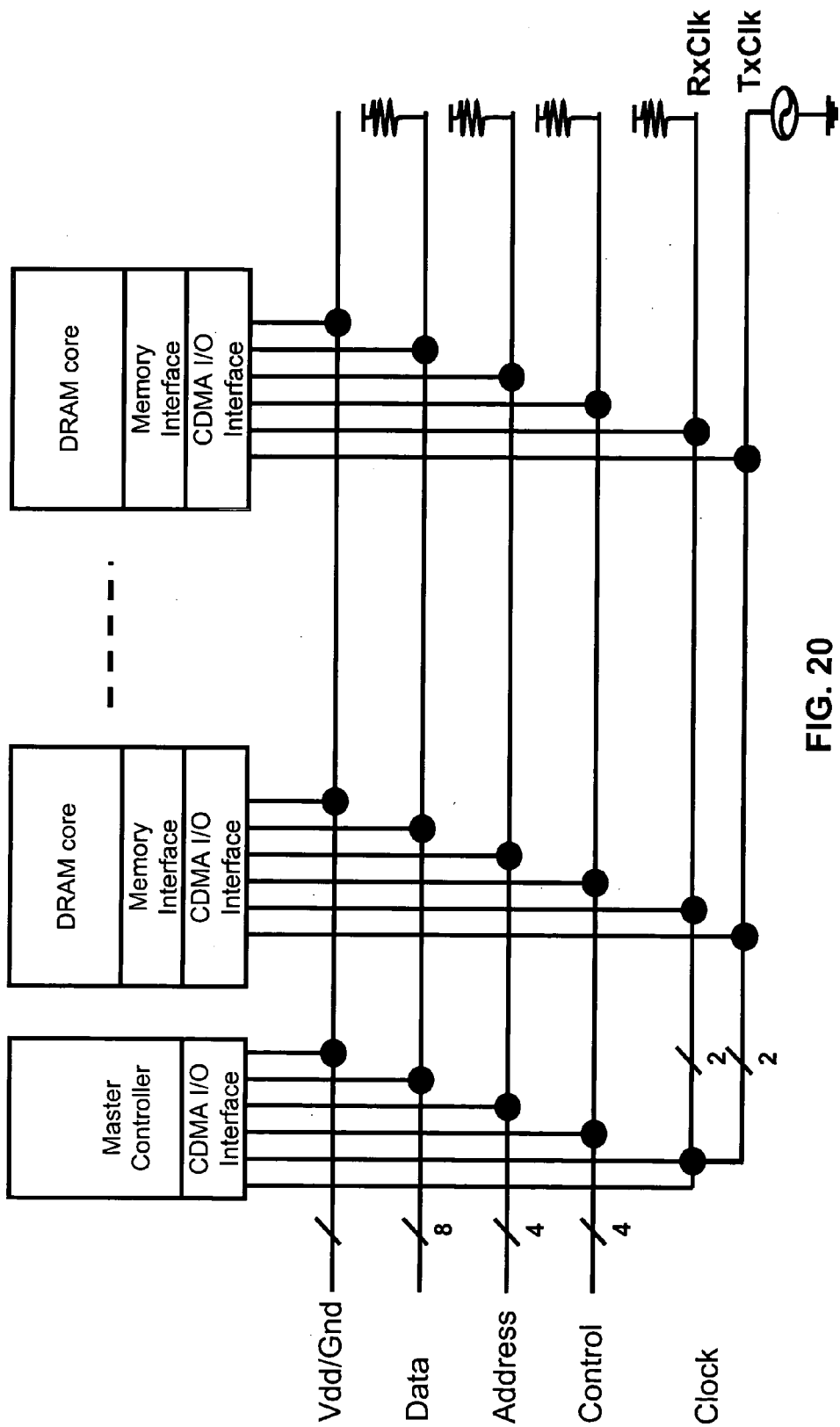
FIG. 20 is a block diagram of a DRAM system which employs an SS-CDMA bus interface per the present invention.

One possible memory bus system architecture which employs the present SS-CDMA bus interface is shown in FIG. 20. The bus carries all address, data and control information needed for high-speed communication between devices on the bus. The bus architecture of this invention interconnects master or controller chips and slave chips such as DRAMs.

Figure 21:
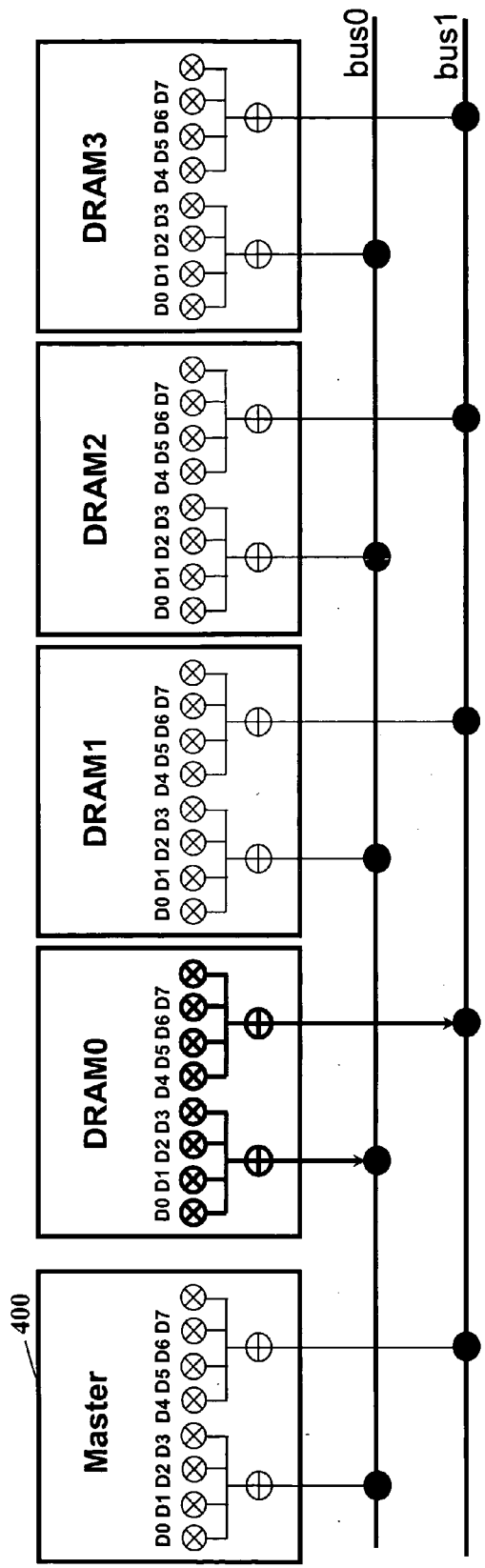
FIG. 21 is a block diagram and coding table illustrating the use of the present SS-CDMA bus interface to provide 4-to-4 simultaneous multi-chip access.

The present SS-CDMA bus interface is adaptable to a multi-Gbps/pin multi-level bus interface with 4-to-4 I/O re-configurable multiple access capability. In this case, the bandwidth expansion factor is 4 and the orthogonal Walsh code is 4 bits. FIG. 21 shows a memory bus system and a possible CDMA orthogonal coding table for 4-to-4 simultaneous multi-chip access with real time I/O re-configurability between two chips—a master device 400 and DRAM0 in this example. When master device 400 and DRAM0 communicate using 2 bus lines, the other DRAM devices are in turn-off or standby mode. The I/O modulators (D0-D7) of DRAM0 use 4-bit CDMA orthogonal codes W0-W7 to send data, and the demodulators (D0-D7) of master device 400 use the same orthogonal codes (W0-W7) to recover the same data.

Figure 22:
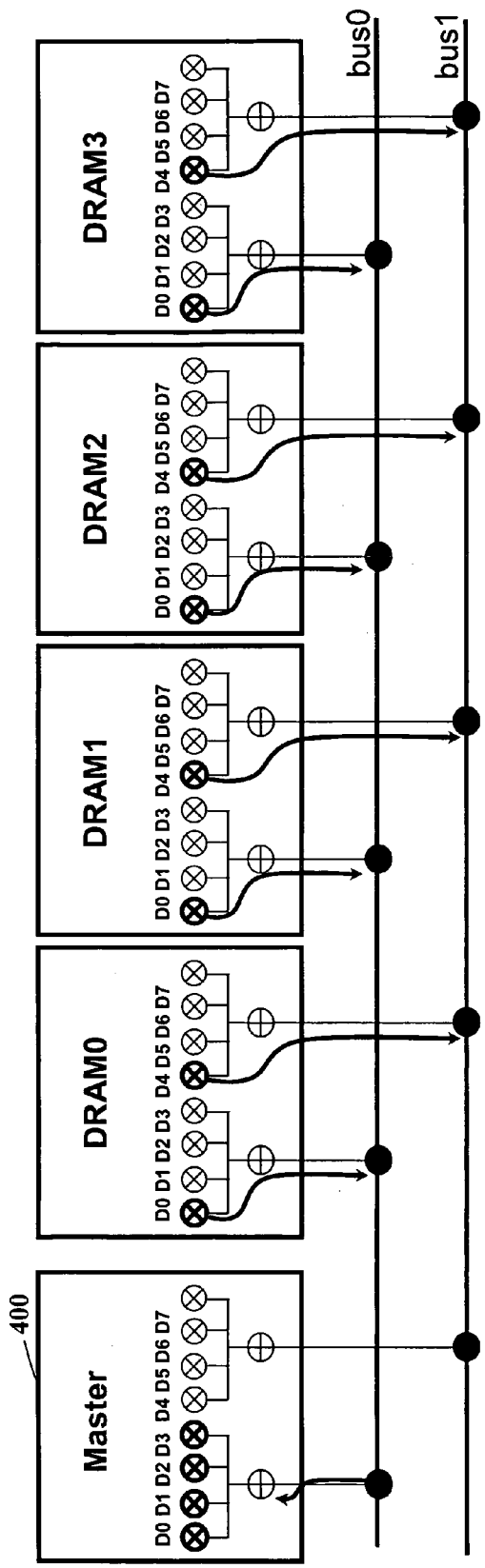
FIG. 22 is a block diagram and coding table illustrating the use of the present SS-CDMA bus interface to provide 4-to-4 simultaneous multi-chip access.

In the example shown in FIG. 22, master chip 400 communicates with 4 DRAM devices at the same time. For example, transmitter D0 of DRAM0 could send one bit data by using CDMA code W0, while transmitter D0 of DRAM1 sends another one bit of data by using code W1. Similarly, transmitter D0 of DRAM2 uses code W2 and transmitter D0 of DRAM3 uses code W3. The 4 bits of data are superposed on bus0 and transmitted to the master. I/O demodulators (D0-D3) of the master device receive a 5-level signal on bus0 and recover 4 bits of data using orthogonal codes W0-W3. The master chip can receive a total of 8 bits of data simultaneously by using CDMA orthogonal codes W0-W7 and two bus lines.

Though the invention is well-suited for use as a memory bus interface, it is not limited to this application. For example, the bus interface could be used to facilitate communications between multiple CPUs.

While particular embodiments of the invention have been shown and described, numerous variations and alternate embodiments will occur to those skilled in the art. Accordingly, it is intended that the invention be limited only in terms of the appended claims.

We claim:

1. A source synchronous CDMA bus interface, comprising:
   a single data channel;
   at least one data transmitter circuit coupled to said data channel at a first point;
   at least one data receiver circuit coupled to said data channel at a second point;
   a system clock line which runs adjacent and parallel to said data channel; and
   a system clock signal applied to said system clock line such that said system clock signal propagates in parallel with data sent from said at least one data transmitter circuit to said at least one data receiver circuit via said data channel;
   the at least one of said data transmitter circuits comprising:
   a first clock signal generating circuit coupled at its input to said system clock line at a point approximately adjacent to said first point, said first clock generating circuit arranged to generate a first clock signal derived from said system clock signal;

a modulating circuit connected to receive base-band data to be transmitted via said data channel at a first input and a unique orthogonal code at a second input and to produce data modulated by said unique orthogonal code at an output; and a transmitter connected to receive said modulated data and said first clock at respective inputs and which is arranged to use said first clock to align said modulated data with said system clock signal and to provide said aligned modulated data at an output which is coupled to said data channel at said first point such that said aligned modulated data is transmitted using source synchronous clocking;

the at least one of said data receiver circuits comprising:

a second clock signal generating circuit coupled at its input to said system clock line at a point approximately adjacent to said second point, said second clock generating circuit arranged to generate a second clock signal derived from said system clock signal;

a receiver coupled to said data channel at said second point such that it receives said aligned modulated data and said second clock at respective inputs and which is arranged to use said second clock to align said received data with said system clock signal; and a demodulating circuit connected to receive said aligned received data at a first input and said unique orthogonal code at a second input and to produce data demodulated with said orthogonal code at an output and thereby recover said base-band data;

wherein said at least one data transmitter circuit and at least one data receiver circuit comprise two data transmitter circuits and two data receiver circuits, each of said modulating circuits receiving respective unique orthogonal codes and each of said demodulating circuits corresponding to one of said modulating circuits and receiving said modulating circuit's orthogonal code, said unique orthogonal codes enabling the aligned modulated data from said two data transmitter circuits to be conveyed via said single data channel to said two data receiving circuits simultaneously using 3-PAM signaling, said receiver comprising first and second 2-bit interleaving analog-to-digital converters (ADCs) for handling even and odd data, respectively, each of said 2-bit ADCs receiving two DC reference voltages such that said ADC converts said 3-PAM signal to thermometer coded data.

2. The bus interface of claim 1, wherein said first and second clock generating circuits are delay-locked-loop (DLL) circuits.

3. The bus interface of claim 1, wherein said first and second clock generating circuits are phase-locked-loop (PLL) circuits.

4. The bus interface of claim 1, wherein said orthogonal codes are Walsh codes.

5. The bus interface of claim 1, wherein said two data transmitter circuits share said first clock signal and the outputs of said two data transmitter circuits are connected together at a common node which is coupled to said data channel at said first point.

6. The bus interface of claim 1, wherein the outputs of said two data transmitter circuits are coupled to said data channel at different points along said data channel, each of said data transmitter circuits having respective first clock circuits, the input of each first clock circuit connected to said system clock line at a point approximately adjacent to where said first clock circuit's data transmitter circuit is coupled to said data channel, such that the outputs of said data transmitter circuits are transmitted using source synchronous clocking and superposed in said data channel.

7. The bus interface of claim 1, wherein said two data receiver circuits share said second clock signal and the inputs of said two data receiver circuits are connected together at a common node which is coupled to said data channel at said second point.

8. The bus interface of claim 1, wherein the inputs of said two data receiver circuits are coupled to said data channel at different points along said data channel, each of said data receiver circuits having respective second clock circuits, the input of each second clock circuit connected to said system clock line at a point approximately adjacent to where said second clock circuit's data receiver circuit is coupled to said data channel.

9. The bus interface of claim 1, further comprising a system controller which provides said unique orthogonal codes to said data transmitter circuits and said data receiving circuits such that aligned modulated data coupled to said data channel is received and demodulated by a specific data receiver circuit, said system controller thereby configuring said bus interface.

10. The bus interface of claim 1, wherein said orthogonal codes are 2-bit Walsh codes.

11. The bus interface of claim 1, wherein said orthogonal codes are 4-bit Walsh codes.

12. The bus interface of claim 1, wherein said data channel is parallel terminated at each end.

13. The bus interface of claim 1, wherein said data channel is a transmission line.

14. The bus interface of claim 1, further comprising at least one data storage device interfaced to said two data transmitter circuits such that said bus interface provides a memory bus which conveys data from said at least one data storage device to said two data receiver circuits.

15. The bus interface of claim 14, further comprising at least one CPU interfaced to said two data receiver circuits such that said memory bus conveys data from said at least one data storage device to said at least one CPU.

16. The bus interface of claim 14, further comprising at least one memory controller interfaced to said two data receiver circuits such that said memory bus conveys data from said at least one data storage device to said at least one memory controller.

17. The bus interface of claim 1, wherein said modulating circuit comprises at least one exclusive-OR gate connected to receive said base-band data and said unique orthogonal code at respective inputs and to produce said modulated data at said output, said modulated data $cd0(t)$ given by:
$cd0(t)=D0(t)\oplus C0(t)$,
wherein $D0(t)$ is said base-band data and $C0(t)$ is said unique orthogonal code.

18. The bus interface of claim 1, wherein each of said transmitters comprise an output driver having a current-mode open-drain structure.

19. The bus interface of claim 1, wherein said demodulating circuit comprises a plurality of exclusive-OR gates connected to receive said even and odd thermometer coded data and said unique orthogonal codes and to de-spread said thermometer coded data using said unique orthogonal codes.

20. The bus interface of claim 19, wherein said demodulating circuit further comprises a plurality of integrator circuits connected to receive said de-spread even and odd thermometer coded data and to integrate said data.

21. The bus interface of claim 20, wherein said demodulating circuit further comprises a plurality of sense amplifier flip-flops (SAFF) connected to receive, amplify, and latch said integrated data and to recover said base-band data.

22. A source synchronous CDMA bus interface, comprising:
- a single data channel;
- at least one data transmitter circuit coupled to said data channel at a first point;
- at least one data receiver circuit coupled to said data channel at a second point;
- a system clock line which runs adjacent and parallel to said data channel; and
- a system clock signal applied to said system clock line such that said system clock signal propagates in parallel with data sent from said at least one data transmitter circuit to said at least one data receiver circuit via said data channel;
- the at least one of said data transmitter circuits comprising:
  - a first clock signal generating circuit coupled at its input to said system clock line at a point approximately adjacent to said first point, said first clock generating circuit arranged to generate a first clock signal derived from said system clock signal;
  - a modulating circuit connected to receive base-band data to be transmitted via said data channel at a first input and a unique orthogonal code at a second input and to produce data modulated by said unique orthogonal code at an output; and
  - a transmitter connected to receive said modulated data and said first clock at respective inputs and which is arranged to use said first clock to align said modulated data with said system clock signal and to provide said aligned modulated data at an output which is coupled to said data channel at said first point such that said aligned modulated data is transmitted using source synchronous clocking;
- the at least one of said data receiver circuits comprising:
  - a second clock signal generating circuit coupled at its input to said system clock line at a point approximately adjacent to said second point, said second clock generating circuit arranged to generate a second clock signal derived from said system clock signal;
  - a receiver coupled to said data channel at said second point such that it receives said aligned modulated data and said second clock at respective inputs and which is arranged to use said second clock to align said received data with said system clock signal; and
  - a demodulating circuit connected to receive said aligned received data at a first input and said unique orthogonal code at a second input and to produce data demodulated with said orthogonal code at an output and thereby recover said base-band data;
- wherein said system clock line runs adjacent and parallel to said data channel in a first direction, reverses direction and continues adjacent and parallel to said data channel in a second direction opposite said first direction, said system clock signal applied to said system clock line such that said system clock signal propagates down said system clock line in said first direction and continues down said system clock line is said second direction.

23. The bus interface of claim 22, wherein said data channel conveys data bi-directionally between said data transmitter circuits and said data receiver circuits, a data transmitter circuit conveying data to a data receiver circuit in said first direction having their respective clock generating circuit inputs connected to respective points on the portion of said system clock line running in said first direction, and a data transmitter circuit conveying data to a data receiver circuit in said second direction having their respective clock generating circuit inputs connected to respective points on the portion of said system clock line running in said second direction.

* * * * *